(12) United States Patent
Tsuchiya et al.

(10) Patent No.: US 7,745,795 B2
(45) Date of Patent: Jun. 29, 2010

(54) RADIATION DETECTOR, RADIATION DETECTOR ELEMENT, AND RADIATION IMAGING APPARATUS

(75) Inventors: Katsutoshi Tsuchiya, Hitachi (JP); Hiroshi Kitaguchi, Naka (JP); Kazuma Yokoi, Hitachi (JP); Kikuo Umegaki, Hitachinaka (JP); Kensuke Amemiya, Hitachinaka (JP); Yuuichirou Ueno, Hitachi (JP); Norihito Yanagita, Hitachi (JP); Shinichi Kojima, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/045,934

(22) Filed: Mar. 11, 2008

(65) Prior Publication Data

US 2008/0283760 A1    Nov. 20, 2008

Related U.S. Application Data

(60) Division of application No. 11/491,197, filed on Jul. 24, 2006, now Pat. No. 7,378,662, which is a continuation of application No. 10/678,303, filed on Oct. 6, 2003, now Pat. No. 7,119,340.

(30) Foreign Application Priority Data

Oct. 7, 2002    (JP)    ............................. 2002-294295

(51) Int. Cl.
*G01T 1/161* (2006.01)
(52) U.S. Cl. .............................. 250/370.01; 250/370.08
(58) Field of Classification Search ............ 250/370.08, 250/370.09, 370.11, 370.01
See application file for complete search history.

(56) References Cited

U.S. PATENT DOCUMENTS 4,472,728 A    9/1984    Grant et al.

(Continued)

FOREIGN PATENT DOCUMENTS

DE    4025427    2/1992

(Continued)

OTHER PUBLICATIONS

Medical Image Radiation Appartaus Handbook, Japan Indus. Assoc. of Radiological Systems; p. 184; Mar. 1989.

(Continued)

*Primary Examiner*—David P Porta
*Assistant Examiner*—Mark R Gaworecki
(74) *Attorney, Agent, or Firm*—Dickstein Shapiro LLP

(57) ABSTRACT

In a gamma camera, a plurality of radiation detector elements having a rod-shaped first electrode, a semiconductor device surrounds the first electrode to contact with it for entering a radiation, and a second electrode provided for the side surface of the semiconductor device are detachably attached to a holding member. The holding member has a first electrode contact portion contacted with the first electrode and a second electrode contact portion contacted with the second electrode. A collimator in which a plurality of radiation paths provided corresponding to the plurality of radiation detector elements are formed is arranged on the radiation entering side of the plurality of radiation detector elements. A γ-ray detection signal outputted from the first electrode contact portion is sent to a signal processing integrated circuit. A high voltage is applied to the second electrode via the second electrode contact portion.

6 Claims, 20 Drawing Sheets

U.S. PATENT DOCUMENTS

| | | |
|---|---|---|
| 5,338,897 A | 8/1994 | Tsay et al. |
| 5,847,398 A | 12/1998 | Shahar et al. |
| 6,207,957 B1 | 3/2001 | Kammeraad et al. |
| 6,236,051 B1 | 5/2001 | Yamakawa et al. |
| 6,285,028 B1 | 9/2001 | Yamakawa |
| 6,710,435 B2 | 3/2004 | Nagaya et al. |
| 7,119,340 B2 | 10/2006 | Tsuchiya et al. |
| 2002/0079456 A1 | 6/2002 | Lingren et al. |

FOREIGN PATENT DOCUMENTS

| | | |
|---|---|---|
| JP | 56051877 | 5/1981 |
| JP | 58-143285 | 8/1983 |
| JP | 61-292969 | 12/1986 |
| JP | 5-259496 | 10/1993 |
| JP | 06-120550 | 4/1994 |
| JP | 9-236666 | 9/1997 |
| JP | 11-126890 | 5/1999 |
| JP | 11-133155 | 5/1999 |
| JP | 11-281747 | 10/1999 |
| JP | 11281747 | 10/1999 |
| JP | 11304930 | 11/1999 |
| JP | 11-344573 | 12/1999 |
| JP | 2000-56021 | 2/2000 |

OTHER PUBLICATIONS

Radiation Detection and Measurement; Third Edition; p. 903; Nov. 30, 1982.

New Medical Apparatus Dictionary of the Soc. of Indus. Exam.; p. 419; Sep. 1997.

European Search Report dated Oct. 17, 2007.

FIG. 13

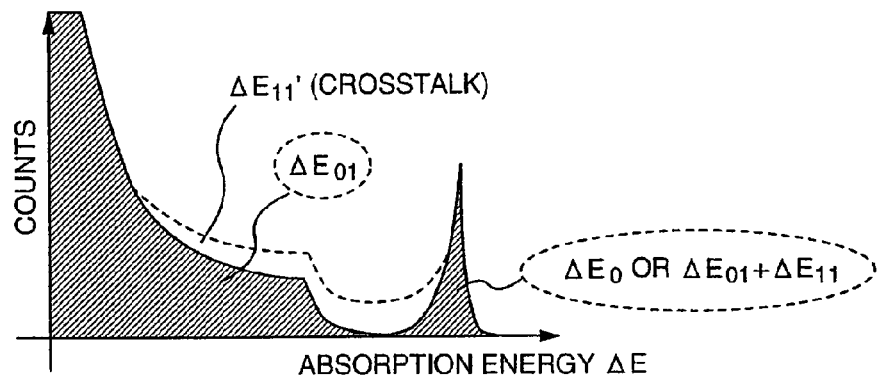

$\gamma_0\ (E_0)$ : DIRECT γ-RAY FROM γ-RAY SOURCE
$\gamma_1\ (E_1)$ : SCATTERED RADIATION IN DETECTOR
$\gamma_1'\ (E_1)$ : SCATTERED RADIATION TO ADJACENT CELL (CROSSTALK)
$\Delta E_{00}$ : PHOTOELECTRIC ABSORPTION OF DIRECT γ-RAY (TOTAL ABSORPTION) $(=E_0)$
$\Delta E_{01}$ : ENERGY OF RECOIL ELECTRONS DUE TO COMPTON SCATTERING $(=E_0-E_1)$
$\Delta E_{11}$ : PHOTOELECTRIC ABSORPTION OF SCATTERED RADIATION $(=E_1)$
$\Delta E_{11}'$ : PHOTOELECTRIC ABSORPTION OF SCATTERED RADIATION TO ADJACENT CELL (CROSSTALK)

FIG. 15

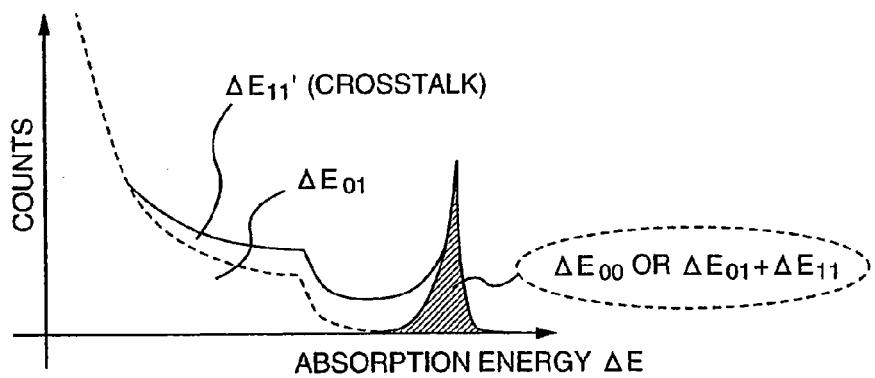

$\gamma_0\ (E_0)$ : DIRECT γ-RAY FROM γ-RAY SOURCE
$\gamma_1\ (E_1)$ : SCATTERED RADIATION IN DETECTOR
$\gamma_1'\ (E_1)$ : SCATTERED RADIATION TO ADJACENT CELL (CROSSTALK)
$\Delta E_{00}$ : PHOTOELECTRIC ABSORPTION OF DIRECT γ-RAY (TOTAL ABSORPTION) $(=E_0)$
$\Delta E_{01}$ : ENERGY OF RECOIL ELECTRONS DUE TO COMPTON SCATTERING $(=E_0-E_1)$
$\Delta E_{11}$ : PHOTOELECTRIC ABSORPTION OF SCATTERED RADIATION $(=E_1)$
$\Delta E_{11}'$ : PHOTOELECTRIC ABSORPTION OF SCATTERED RADIATION TO ADJACENT CELL (CROSSTALK)

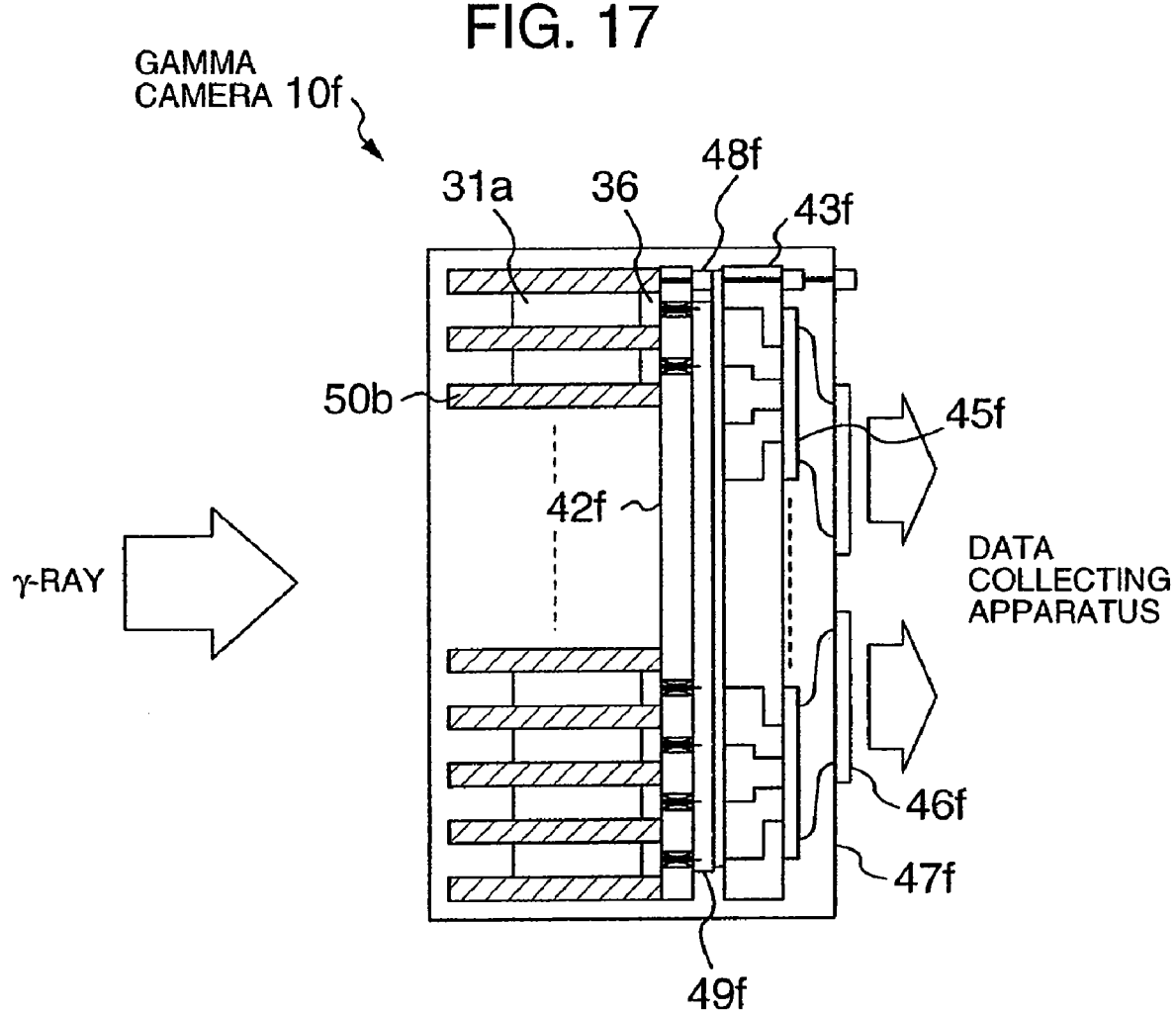

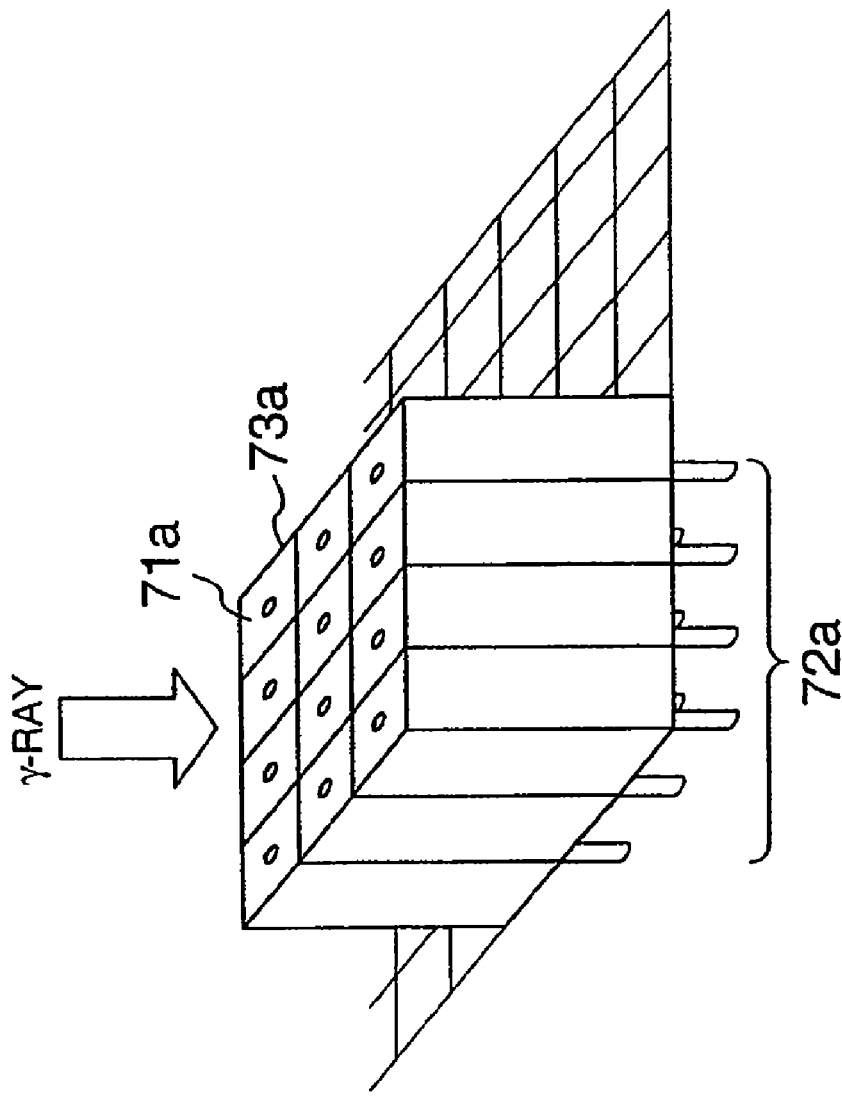
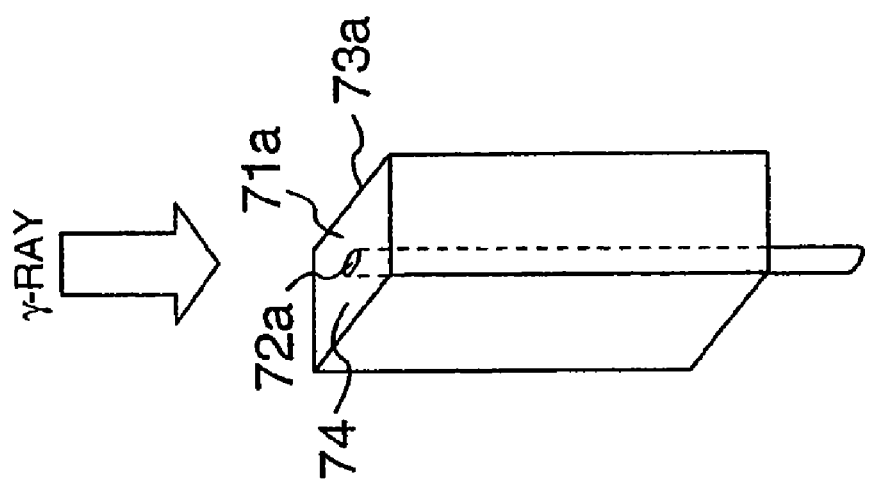
FIG. 18A
FIG. 18B

FIG. 21A  FIG. 21B  FIG. 21C
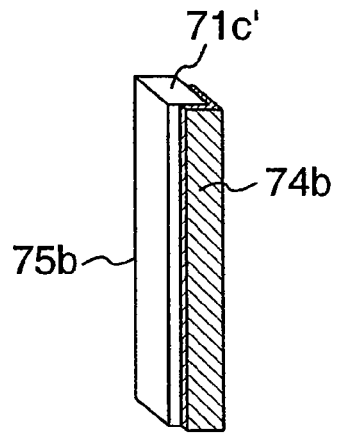
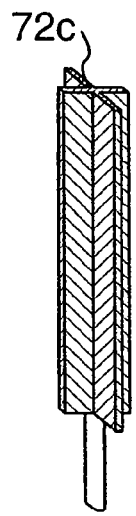
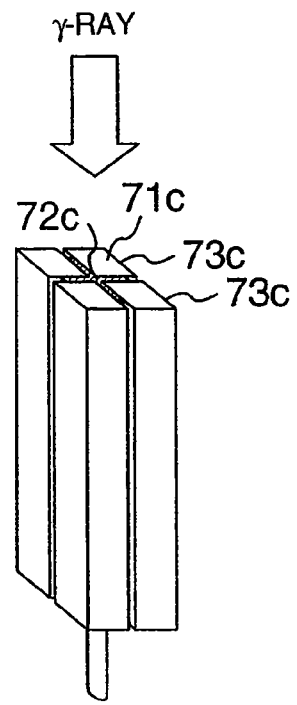
FIG. 22A  FIG. 22B
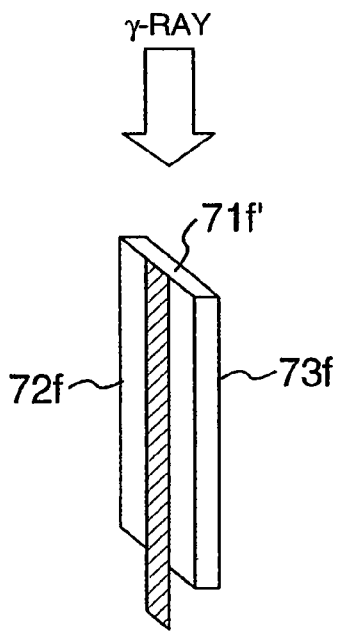
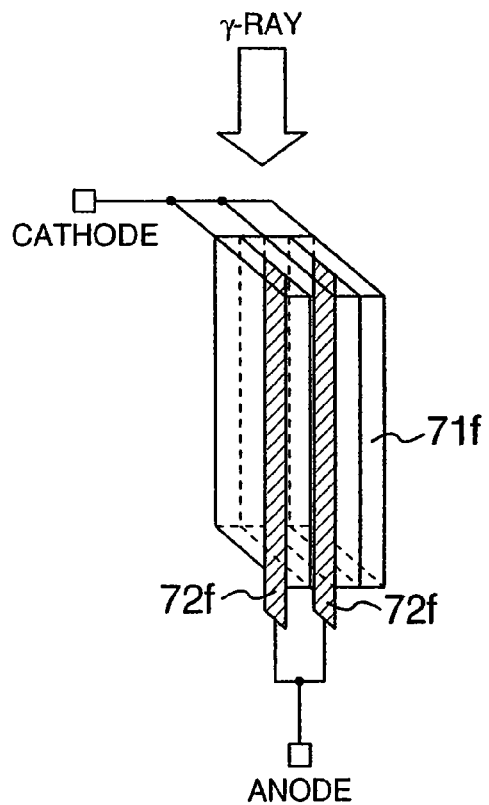

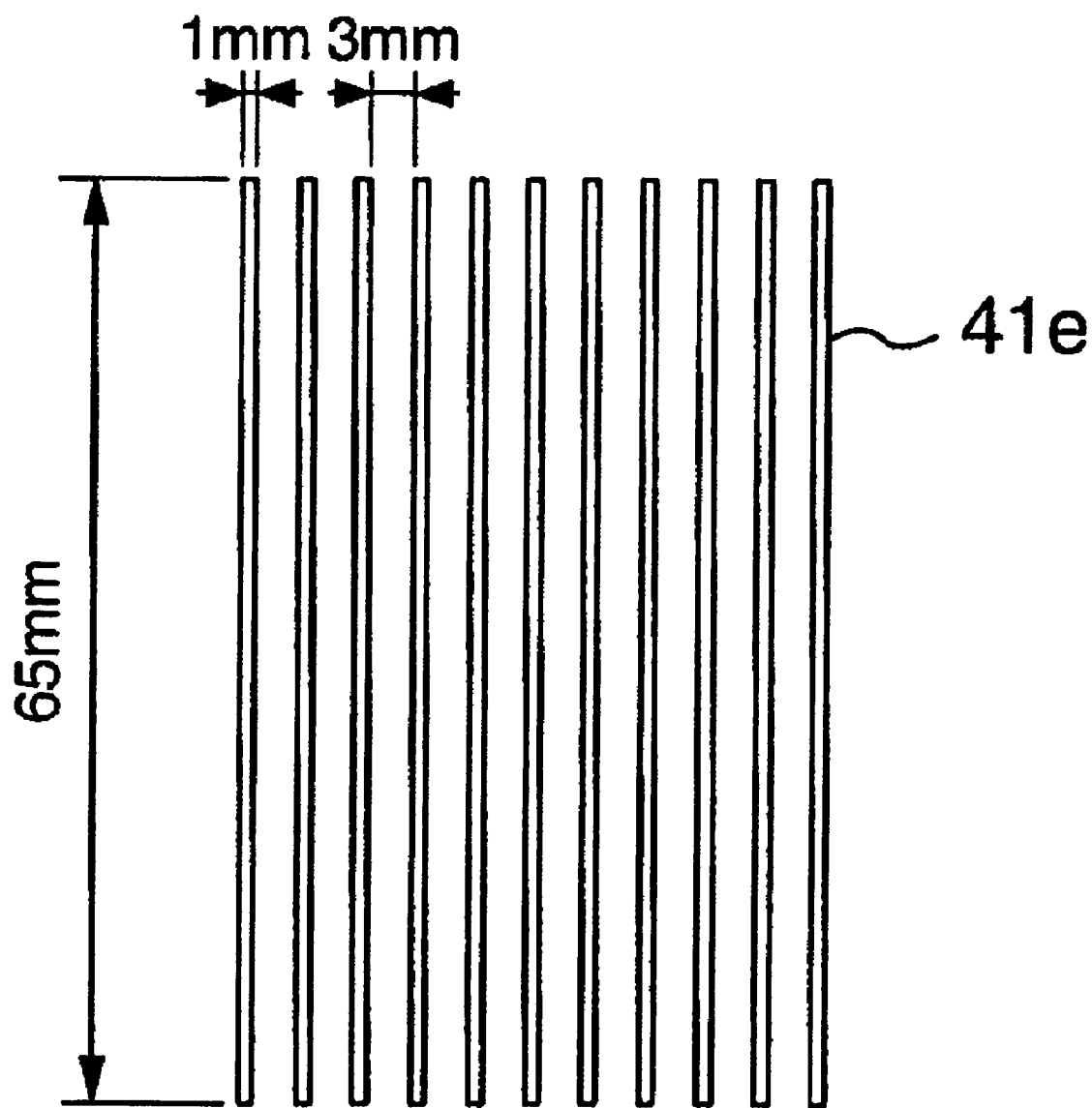

RADIATION DETECTOR, RADIATION DETECTOR ELEMENT, AND RADIATION IMAGING APPARATUS

CROSS-REFERENCE TO RELATED APPLICATIONS

The present application is a divisional of U.S. application Ser. No. 11/491,197, filed Jul. 24, 2006, which is a continuation of U.S. application Ser. No. 10/678,303, filed Oct. 6, 2003, which claims the benefit of Japanese Application No. 2002-294295, filed on Oct. 7, 2002, the disclosures of which are herewith incorporated by reference in their entirety.

BACKGROUND OF THE INVENTION

1. Field of the Invention

The invention relates to detection and an imaging operation of a radiation such as X-ray, γ-ray, or the like and, more particularly, to a radiation detector, a radiation detector element, and a radiation imaging apparatus for detecting a γ-ray of high energy.

2. Description of the Related Art

When taking a medical X-ray as an example, as well as a radiation imaging apparatus of a film type, radiation imaging apparatuses such as imaging plate and flat panel detector (FPD) having both excellent resolving power and resolution have been developed. As a detector element, there has been used: a scintillation detector formed by combining a scintillator which reacts on a radiation and emits light and a photomultiplier or a photodiode which converts the light into charges; or a solid state device such as a semiconductor radiation detector which reacts on the radiation and directly collects generated charges or the like. For example, the FPD using a number of scintillation detectors is a large-area imaging apparatus which can image a transmission X-ray in a manner similar to a conventional X-ray imaging film. An X-ray signal detected in the detector element is read out from a detector element substrate of a large area comprising one or a plurality of sheets by using a TFT technique or the like. As a name "flat panel" shows that the detector element is very thin and the detector itself has a plate shape.

According to a gamma camera (radiation detector) for imaging a γ-ray emitted from a chemical-ray source dosed into a human body, since energy of the γ-ray which is used is higher than that of the X-ray, if the γ-ray is used as it is, sensitivity of the gamma camera deteriorates remarkably. That is, with a thickness of the detector element which is used in an X-ray imaging apparatus, a reaction probability of the γ-ray is low and the γ-ray passes through the detector element as it is. Therefore, to improve the sensitivity by raising the reaction probability in the detector element, the detector element needs to have a thickness of a certain extent in the incident direction of the γ-ray. That is, the detector element itself has directivity. Accordingly, unless the incident direction of the γ-ray is specified for such a detector having the directivity, space resolution cannot be obtained.

Generally, to specify the incident directivity of the γ-ray, a slit called a collimator or a thick porous metal plate is arranged in front of the detector. (Refer to "Medical Image•Radiation Apparatus Handbook", Japan Industries Association of Radiological Systems, page 184)

FIG. 25 shows a construction of a conventional gamma camera disclosed in the above reference. At present, a gamma camera using an NaI scintillator is still a mainstream. The gamma camera of FIG. 25 also uses a similar scintillator 31. A radiation enters the scintillator 31 at an angle limited by a collimator 41e and scintillation light is emitted. The light reaches a photomultiplier 33 through a light guide 32 and becomes an electric signal. The electric signal is shaped by a measuring circuit 34 attached to a measuring circuit fixing board 35 and sent from an output connector 46e to an external data collecting system. A whole camera is enclosed in a light shielding casing 47e, thereby shielding external electromagnetic waves other than the radiation.

Generally, since the gamma camera using the scintillator 31 as shown in FIG. 25 has a structure in which the large photomultiplier 33 is arranged behind a crystal of large scintillator 31 of one sheet, its space resolution is no more than equal to about 10 mm. When the scintillator 31 is utilized, it detects the radiation via multi-level conversion from the radiation to the visible light and from the visible light to electrons, there is a problem such that energy resolution is low. Therefore, at present, a radiation detecting apparatus having a semiconductor radiation detector element for directly converting the radiation into the electric signal in place of the scintillator 31 has been developed. ("Radiation Detection and Measurement, the 3rd edition", The Nikkan Kogyo Shimbun Ltd., page 903)

In a conventional gamma camera (semiconductor radiation detector) shown in FIG. 26A, a semiconductor device 77 has electrodes (an anode 78 and a cathode 79). The semiconductor device 77 has a construction in which the anodes 78 are arranged in a lattice form by the electrodes 78 and 79 ("Radiation Detection and Measurement, the 3rd edition", The Nikkan Kogyo Shimbun Ltd., page 903). Reference numeral 41e denotes the collimator; 44' a board for installing semiconductor device and an ASIC; 45c an ASIC (Application Specific Integrated Circuit) as an IC for a reading circuit; 46c an output connector to output a detection signal; and 47c a light shielding casing to shield the visible light and electromagnetic waves.

Also in the gamma camera, as same as in the FPD, realization of a large imaging area is indispensable. A number of detector elements are necessary in association with the realization of the large area. In the case of the scintillation detector, such a number of detector elements are separated as elements by the photomultiplier or photodiode disposed adjacently to one large device substrate. In the case of the semiconductor radiation detector, they are separated as elements by pattern wirings of the electrodes 78 and 79 as shown in FIG. 26B. To remove scattered components of the γ-ray, intensity information of the γ-ray is obtained by counting pulses. For this purpose, a preamplifier, a waveform shaping circuit, a peak detecting circuit, and the like are necessary for each element and an extremely large number of circuits are necessary in the case of a large area. Therefore, by using the ASIC 45c for those circuits, saving of space is realized.

In the conventional semiconductor radiation detector as shown in FIGS. 26A and 26B, however, even if the collimator 41 e is used, the γ-ray scattered in the detector element 77 (scintillator 31) enters the adjacent cell and exercises an influence thereon. This kind of scattering radiation detection (refer to $\gamma_1$' in FIG. 14) causes a deterioration in space resolution. To avoid an inconvenience caused by such a phenomenon, in the radiation detector, an incident position is identified by energy of the incident γ-ray ($\gamma_0$). That is, since a reaction signal ($\Delta E_{00}$) near the energy of the γ-ray emitted from a γ-ray source 16d is discriminated and selectively detected, sensitivity deteriorates more. That is, the sensitivity of the radiation detector is extremely lowered by the inherent low sensitivity, the decrease in incident γ-ray due to the collimator 41 e and the discrimination of the energy. Although a hole diameter of the collimator 41 e is increased and an incident dose is increased while sacrificing the space resolution in order to compensate the deterioration in sensitivity, the higher the energy of the γ-ray to be detected is, the thicker a wall of the collimator 41 *e* has to be. Consequently, not only the space resolution deteriorates even more but a weight increases and maintenance efficiency of the radiation detector or the radiation imaging apparatus also deteriorates.

Since a number of radiation detector elements (pixels) are necessary for the large-area imaging, use of the ASIC and the element separation by electrode patterning of a signal lead-out portion are indispensable. However, they cause the following problems.

(1) An installing board of the detector and the ASIC are integratedly formed by bumping or the like and if one pixel is destroyed, the board has to be exchanged on a large unit basis. Since the detector element is very expensive, the exchange of the board on a large unit basis denotes that large costs are required.

(2) Also in view of the manufacturing of the camera, since the detector elements and the ASIC are installed onto one installing board, assembling steps of the camera are extremely complicated and, even if a defective element is found, it cannot be exchanged.

(3) Particularly in the radiation detector for imaging the high-energy γ-ray, a length of collimator is long, a total length of radiation imaging apparatus is very long, and it is very heavy and large in size. This causes an enlargement in size of the apparatus in terms of intensity of structure members which support a camera unit and results in an increase in costs, a deterioration in maintenance efficiency, and an increase in anxiety of the patient.

In other words, it causes a deterioration in maintenance efficiency of the radiation detector and the radiation imaging apparatus.

SUMMARY OF THE INVENTION

It is, therefore, an object of the invention to improve sensitivity (effective count, S/N ratio and maintainability) of a radiation of a radiation detector and a radiation imaging apparatus.

To accomplish the above object, a radiation detector according to the invention comprises a plurality of radiation detector elements each having: a rod-shaped first electrode; a semiconductor device which surrounds an ambience of the first electrode and is come into contact with the first electrode and into which a radiation enters; and a second electrode provided for the side surface of the semiconductor device. Thus, sensitivity to the radiation (effective count, S/N ratio) can be raised. The radiation detector includes a gamma camera.

More preferably, the radiation detector comprises an element holding member (for example, detector module board) having: a plurality of holding units for detachably holding the radiation detector elements; and an electric connecting portion for electrically connecting anodes and cathodes of the radiation detector elements. An integrated circuit holding member (for example, ASIC module board) in which the element holding member and the integrated circuit (ASIC) have been installed is connected so that it can be separated. The semiconductor radiation detector element is set into a coaxial shape (shape in which a semiconductor device is arranged around (outer periphery) of a rod-shaped anode and a cathode is arranged around (outer periphery) of the semiconductor device) or a laminate structure. A shield of the radiation is arranged between the radiation detector elements. Thus, together with maintainability, the space resolution to the radiation can be raised.

Other objects, features and advantages of the invention will become apparent from the following description of the embodiments of the invention taken in conjunction with the accompanying drawings.

BRIEF DESCRIPTION OF THE DRAWINGS

FIG. 13 is an explanatory diagram showing a scattering radiation from adjacent pixels removing effect in the gamma camera shown in FIG. 6;

FIG. 15 is an explanatory diagram showing energy spectrum of detected γ ray obtained in the detector;

FIG. 16A is an explanatory diagram showing a spacial relation between two γ-ray sources and the detector;

FIG. 16B is an explanatory diagram showing the example of the measured radiation distribution in the γ-ray of 140 keV in FIG. 16A;

FIG. 16C is an explanatory diagram showing the example of the measured radiation distribution in the γ-ray of 511 keV in FIG. 16A;

FIG. 17 is a schematic vertical sectional view of another embodiment (using a scintillator) of a gamma camera;

FIG. 18A is a perspective view of a detector element which is used in a gamma camera in the third embodiment according to the invention;

FIG. 18B is a perspective view showing a state where a plurality of detector elements of FIG. 18A are arranged;

FIG. 21A is a perspective view of a semiconductor device member which is used in a detector element of FIG. 21C;

FIG. 21B is a perspective view of an anode which is used in the detector element of FIG. 21C;

FIG. 21C is a perspective view of another embodiment of the detector element;

FIG. 22A is a perspective view of a semiconductor device member which is used in the detector element of FIG. 22B;

FIG. 22B is a perspective view of another embodiment of the detector element;

FIG. 27 is a cross sectional view of a collimator which is used in the conventional gamma camera.

DETAILED DESCRIPTION OF THE EMBODIMENTS

Embodiments (first to third embodiments) of the invention will be described in detail hereinbelow with reference to the drawings. The first embodiment relates to a radiation detector, an attaching structure of parts and the like in a radiation imaging apparatus, and a connecting structure. The second embodiment relates to miniaturization and simplification of a collimator in the radiation detector. The third embodiment relates to a structure of a detector element (radiation detector element) in the radiation detector.

First Embodiment

Figure 1:
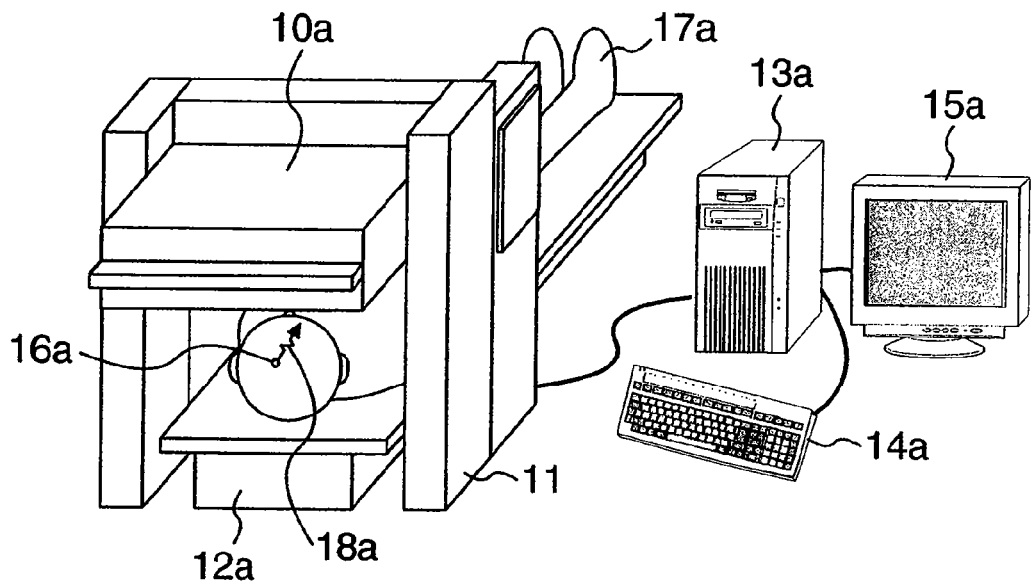
FIG. 1 is a schematic external view of a gamma camera apparatus as a radiation imaging apparatus of an embodiment according to the invention.

A gamma camera imaging apparatus of the first embodiment to improve maintenance performance or the like of a radiation detector by the attaching structure and the connecting structure will be described with reference to FIG. 1 and the like. FIG. 1 is a schematic side sectional view of a gamma camera.

[Gamma Camera Imaging Apparatus (Radiation Imaging Apparatus)]

A gamma camera imaging apparatus is a kind of nuclear medicine diagnosing apparatus. According to this apparatus, a radiomedicine dosed into a human body is accumulated or deposited in the body, a γ-ray emitted from the radiomedicine is measured from a position out of the body, and a diagnosis is assisted on the basis of an accumulation degree or the like. For example, $^{131}I$ is dosed into the human body in a form of sodium iodide and an accumulation degree of sodium iodide accumulated in a thyroid gland is measured from a position out of the body, thereby examining a function of the thyroid gland.

In the gamma camera imaging apparatus of FIG. 1, a subject 17a dosed with a medicine containing RI (Radioisotope) nuclear species as mentioned above is put on a bed 12a and a γ-ray 18a which is radiated from a chemical-ray source 16a accumulated in a diseased part or the like of the subject 17a is imaged by a gamma camera (radiation detector) 10a attached to a gamma camera casing 11 and disposed above the subject 17a. A data processing apparatus 13a for imaging signal information obtained from the gamma camera 10a, a monitor 15a for displaying the image, and an input device (keyboard) 14a are arranged beside the casing 11. It is not always necessary that those data processing systems are located near the casing 11. The gamma camera imaging apparatus is constructed as mentioned above.

[Gamma Camera]

Subsequently, a construction of the gamma camera 10a equipped for the gamma camera imaging apparatus will be described with reference to FIG. 2 and the like. When a first electrode is an anode, a second electrode is a cathode. When the first electrode is the cathode, the second electrode is the anode. In the following embodiments, the anode corresponds to the first electrode and the cathode corresponds to the second electrode.

Figure 2:
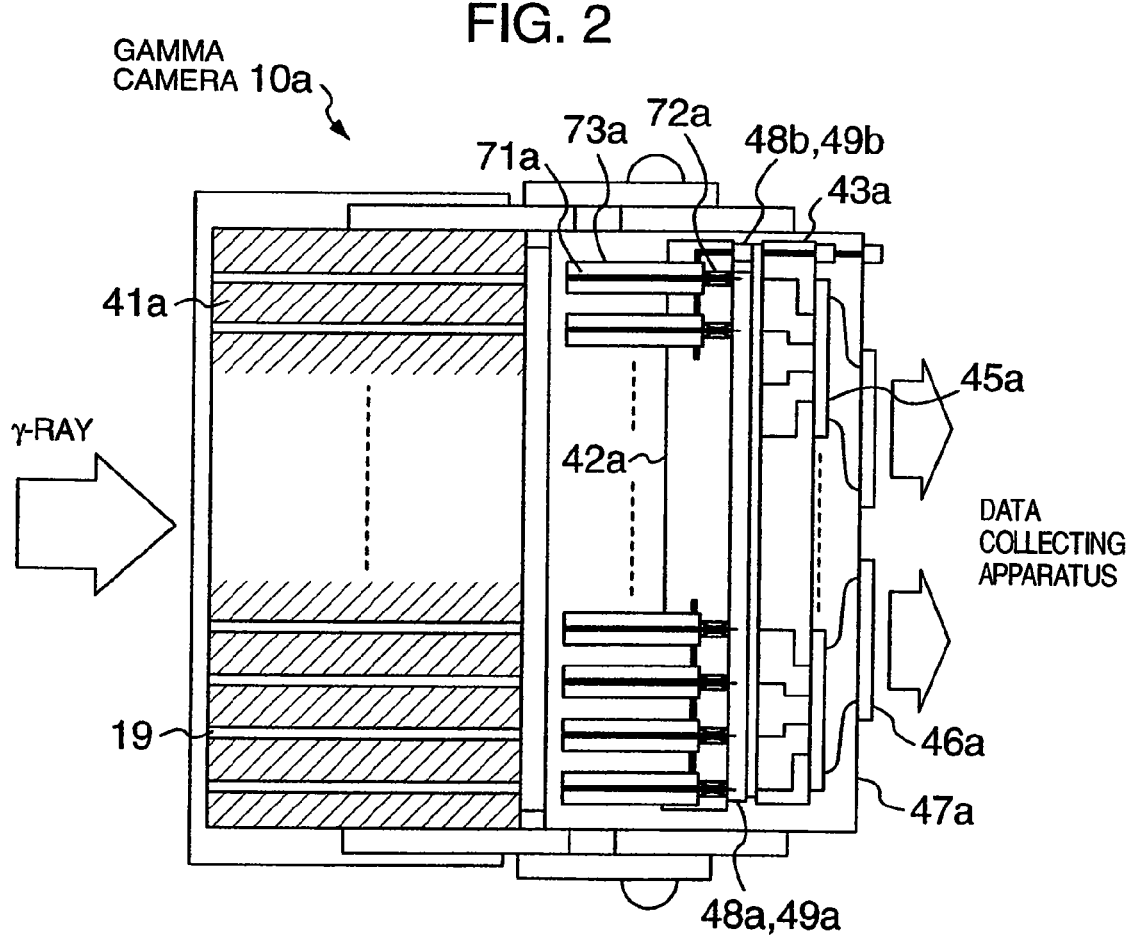
FIG. 2 is a schematic vertical sectional view of the gamma camera in the first embodiment according to the invention.

The gamma camera 10a shown in FIG. 2 is constructed so as to include: a collimator 41a; a plurality of radiation detector elements (hereinafter, simply referred to as detector elements) 71a for detecting the γ-ray; and an ASIC (Application Specific Integrated Circuit) 45a for processing γ-ray detection signals (radiation detection signals) outputted from the detector elements 71a. The detector elements 71a are detachably held and fixed to a detector module board (element holding member) 42a every element. An ASIC module board (integrated circuit holding member) 43a on which the ASIC 45a has been set is arranged behind the detector module board 42a and connected to the detector module board 42a by a connector (anode signal line connectors 48a and 49a; cathode potential supplying connectors 48b and 49b) and they are also detachable. The ASIC 45a is connected to an output connector 46a attached to a rear surface of the gamma camera 10a. Obtained data is sent from the output connector 46a to a data collecting apparatus (not shown). Although a signal is transmitted and received by the anode and an electric potential is supplied by the cathode in the embodiment, on the contrary, it is also possible to supply the electric potential by the anode and transmit and receive the signal by the cathode.

Parts including the detector elements 71a and the ASIC 45a are covered by a light shielding casing 47a in order to avoid an influence of noises due to the light and an influence of electromagnetic noises. The construction described so far relates to a main body of the gamma camera 10a. The collimator 41a to specify the direction of the incident γ-ray is disposed in front of the gamma camera 10a. The collimator 41a is made of a metal which largely attenuates the γ-ray, for example, a radiation shielding material such as lead or tungsten and a plurality of elongated holes (radiation paths) 19 for passing the γ-ray are formed in the collimator. The collimator 41a is detachable from the main body of the gamma camera 10a in order to change the kind of collimator and exchange and use it in accordance with energy of the incident γ-ray. The gamma camera 10a is obtained by covering the whole assembly including the collimator 41a by the casing.

A connection of the detector module board 42a and the ASIC module board 43a will be described hereinbelow with reference to FIG. 3.

Figure 3:
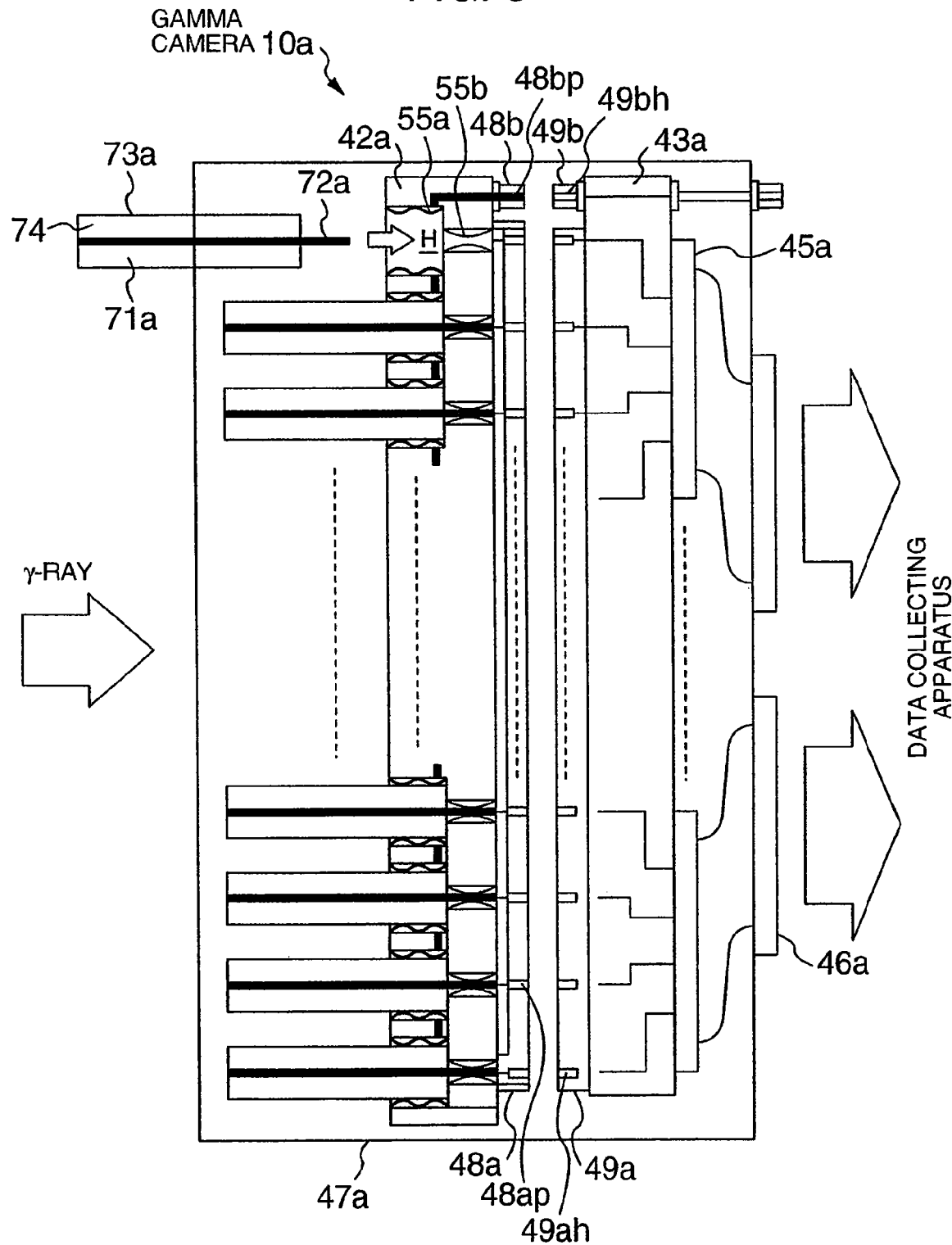
FIG. 3 is a partially enlarged diagram of FIG. 2.

As shown in FIG. 3, the detector element 71a (coaxial electrode element) is constructed so as to include: a rectangular parallelepiped semiconductor device 74; a cathode 73*a* formed thinly by a conductive material onto an outer periphery (the whole side surface) of the semiconductor device 74; and an anode (anode pin) 72*a* pierced at the center of the semiconductor device 74. The anode 72*a* is pierced so as to be projected from a rear edge portion of the detector element 71*a*. An explanation will be made on the assumption that the incident side of the γ-ray of the detector element 71*a* is set to a front edge portion and its opposite side is set to the rear edge portion. The detector element 71*a* corresponds to a radiation detector element in which a semiconductor material which reacts on the radiation and generates charges is arranged around (outer periphery) the first electrode (anode 72*a*) formed in a rod shape and the second electrode (cathode 73*a*) whose polarity differs from that of the first electrode (anode 72*a*) is arranged around (outer periphery) the semiconductor material in a layer shape (film shape). Specially, the detector element 71*a* corresponds to a coaxial element having a construction in which the semiconductor material or the like is coaxially arranged.

A plurality of holding portions H as hole portions each for enclosing and holding the rear edge portion of a predetermined length of the detector element 71*a* are provided for the detector module board 42*a* shown in FIG. 3. The holding portion H has a large diameter portion and a small diameter portion. A rear edge portion of the semiconductor device 74 is inserted into the large diameter portion. The anode (anode pin) 72*a* projecting from the rear edge portion of the detector element 71*a* is inserted into the small diameter portion. A pair of cathode spring electrodes 55*a* which are come into contact with the rear edge portion of the detector element 71*a* are provided in the large diameter portion in each holding portion H so as to face each other. The cathode spring electrodes 55*a* have functions for holding the detector element 71*a* and supplying the cathode potential. A pair of anode spring electrodes 55*b* are provided in the small diameter portion in each holding portion H so as to face each other. The anode spring electrodes 55*b* hold (attach) the detector element 71*a* so as to be detachable from the detector module board 42*a*. Since a leaf spring is bent in an arc shape as each of the cathode spring electrodes 55*a* and the anode spring electrodes 55*b*, the detector element 71*a* is certainly held and also easily detachable.

In the embodiment, the cathode spring electrodes 55*a* and the anode spring electrodes 55*b* can be also provided on the detector element 71*a* side. In this connection, the detector module board 42*a* corresponds to a construction such that a plurality of holding portions H to detachably hold the detector element 71*a* for detecting the radiation via both of the spring electrodes 55*a* and 55*b* are arranged in front of the detector element 71*a* and a plurality of electric connecting portions (holding portions H) to electrically connect the anode 72*a* and the cathode 73*a* of the detector element 71*a* held in the holding portion H are arranged. The gamma camera 10*a* in the embodiment may be referred to as a "radiation detector."

As shown in FIG. 3, the connectors 48*a* and 48*b* are provided for the detector module board 42*a* and the connectors 49*a* and 49*b* are provided for the ASIC module board 43*a*, respectively. The connectors 48*a* and 49*a* are fitted into each other. The connectors 48*b* and 49*b* are fitted into each other. In FIG. 3, to clearly show the construction of the connectors 48*a*, 48*b*, 49*a*, and 49*b*, the connectors 48*a* and 49*a* and the connectors 48*b* and 49*b* are separately shown, respectively. However, actually, the connector 48*a* is fitted into the connector 49*a* and the connector 48*b* is fitted into the connector 49*b*, respectively. Owing to the fitting of those connectors, the detector module board 42*a* is attached to the ASIC module board 43*a*.

The connector 48*a* has signal transfer pins 48*ap* electrically connected to the anode spring electrodes 55*b* (in a one-to-one correspondence relation manner) each of which comes into contact with the anode 72*a* of each detector element 71*a*. Each signal transfer pin 48*ap* is inserted into each of the same number of receiving portions 49*ah* provided for the connector 49*a*. The connector 48*b* connected to the cathode spring electrodes 55*a* provided for each holding portion H has a potential supplying pin 48*bp*. The potential supplying pin 48*bp* is inserted into a receiving portion 49*bh* which is formed in the connector 49*b*. Owing to such a structure, the detector module board 42*a* and the ASIC module board 43*a* are certainly connected. The detector module board 42*a* and the ASIC module board 43*a* can be also removed by disconnecting them.

Subsequently, the operation of the gamma camera 10*a* will be described.

As shown in FIGS. 2 and 3, it is assumed that the γ-ray entered from the left side of the diagram. Since the γ-ray which reached the collimator 41*a* is attenuated by the material constructing the collimator 41*a* in portion other than the elongated hole 19, it cannot reach the detector elements 71*a*. Therefore, the incident direction of the γ-ray which passed through the elongated hole 19, reached the detector elements 71*a*, and was detected by the detector elements 71*a* is specified. Therefore, the position where the γ-ray was emitted can be specified. The detector elements 71*a* collects the electrons and holes formed in the semiconductor device 74 by the incidence of the γ-ray onto the two electrodes of the anode 72*a* and the cathode 73*a*, thereby detecting the incidence of the γ-ray. Energy of the incident γ-ray can be also specified from an amount of charges corresponding to an amount of the collected electrons and holes. A γ-ray detection signal having such a charge amount is outputted from the anode 72*a* of the detector element 71*a* and transferred to the ASIC 45*a* via the anode spring electrodes 55*b*, signal transfer pins 48*ap*, and receiving portion 49*ah*. The ASIC 45*a* processes the γ-ray detection signal generated from each detector element 71*a* and outputs obtained information to the data processing apparatus 13*a* for imaging it. A high voltage which is generated from a high voltage power source (not shown) is transferred to each cathode spring electrode 55*a* via the receiving portion 49*bh* and the potential supplying pin 48*bp* and applied to the cathode 73*a* of each detector element 71*a*. The detecting operation of the signal in the detector element 71*a* will be described in detail in an embodiment of an element, which will be explained hereinlater.

A conventional example will be described hereinbelow with reference to FIGS. 26A and 26B for the purpose of comparing.

Figure 26B:
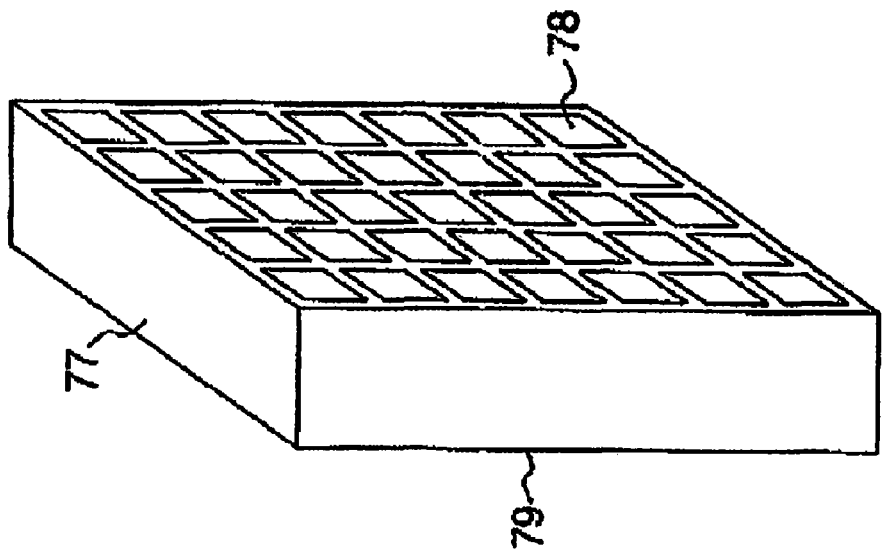
FIG. 26B is a perspective view of a detector element shown in FIG. 26A.
Figure 26A:
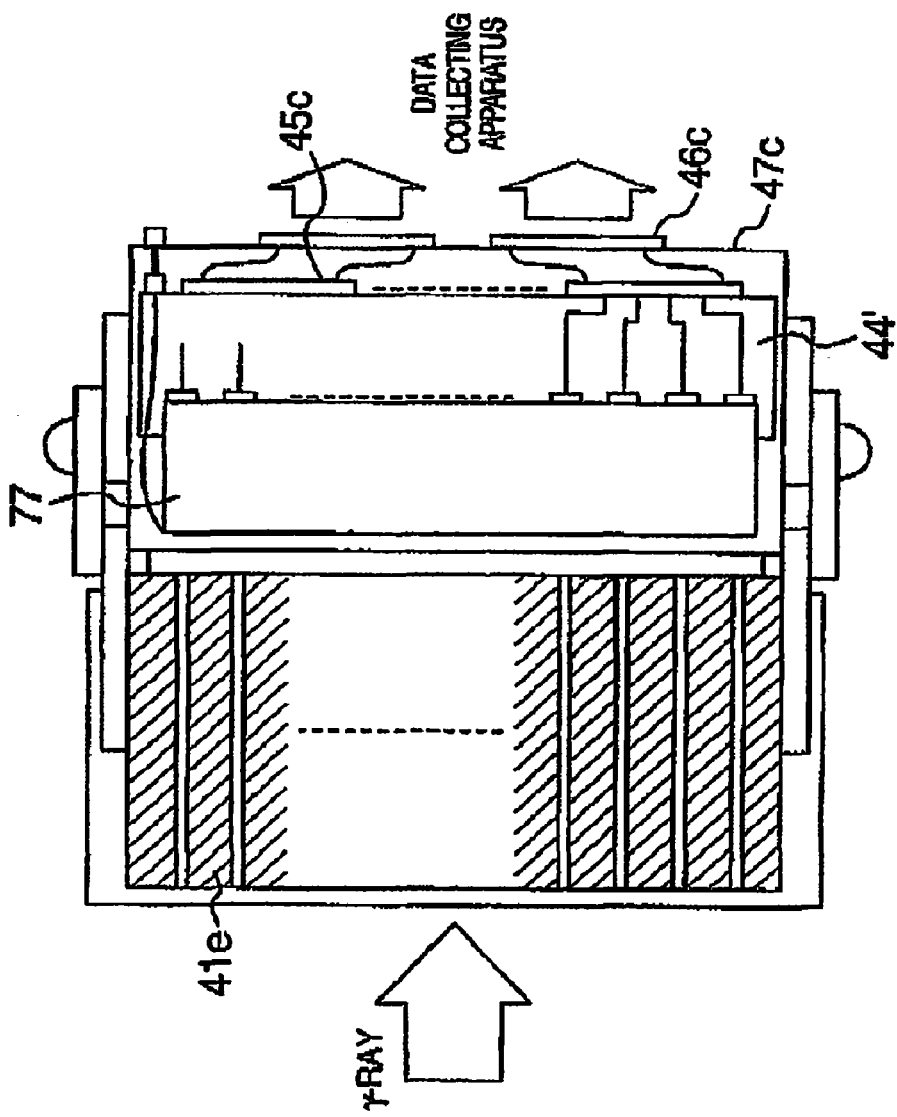
FIG. 26A is a constructional diagram showing another conventional example of the gamma camera.

In the conventional gamma camera shown in FIG. 26A, the detector element 77 is a single large substrate and is constructed as a pixel by a pattern of the electrode 78 as shown in FIG. 26B. The detector element 77 is completely fixed by solder bumping or the like onto the substrate 44' on which the ASIC 45*c* has been installed (other portions are similar to those described with reference to FIG. 2 and the like).

Since such a construction is used, in the conventional gamma camera, if one imaging pixel is destroyed, the whole substrate 44', in turn, the whole ASIC 45, that is, the whole gamma camera has to be exchanged, so that very expensive maintenance costs are required. Even if a defective element (defective pixel) is found out after connecting to the ASIC 45, it cannot be exchanged. Particularly, in the semiconductor radiation detector, the reliability for all detector elements 77 is insufficient yet and it becomes a large obstacle when the imaging apparatus of a large area is put into practical use.

In the embodiment, the structure such that the detector elements are individually detachable is used in consideration of such maintenance performance. Even if one detector element is destroyed, it can be exchanged on a detector element unit basis.

For example, in a condition such that separating type elements (elements of a 3 mm-square) of 1000 ch (1000 channels) are arranged onto a module board of a 10 cm-square, hitherto, if tens of elements (pixels) are broken, the camera module (substrate 44') is exchanged. On the other hand, in the embodiment, since the detector elements 71a can be exchanged one by one, the costs can be reduced into about 1/30. In the conventional technique, even if the element is slightly damaged, it is continuously used in consideration of a relation between a troublesomeness and the costs, so that a clear image cannot be obtained in many cases. On the other hand, according to the gamma camera 10a of the embodiment, a clear image can be obtained by making simple maintenance.

Unlike the prior art, the embodiment has a construction such that the detector module board 42a and the ASIC module board 43a can be separated. By constructing as mentioned above, the ASIC 45a with the high reliability and the detector elements 71a whose reliability cannot be assured can be separated after the destruction, so that degrees of freedom regarding the manufacturing and the maintenance can be raised. Although the bumping connection has been used hitherto for connection of the detector elements 77 and the substrate 44', in the embodiment, since the bumping connection is unnecessary, an influence of heat which is caused upon bumping connection can be avoided.

Further, in the embodiment, even if the subject is imaged by using the same ASIC 45a, the detector elements can be changed to the detector elements 71a in accordance with an energy level of the γ-ray which is used for imaging. For example, in the semiconductor radiation detector, although a CdTe (cadmium telluride) element or an element called CZT has high detecting performance, in the case of imaging mainly by low energy, it is sufficient to buy a gamma camera using a GaAs (gallium arsenide) element that is cheaper than CdTe, buy a CdTe element module (detector module board 42a) which can also cope with the imaging using high energy as necessary, and exchange only the module board 42a. In other words, it is sufficient to separately prepare and exchange only the detector module board 42a to which the detector elements 71a have been attached or only the detector elements 71a. Therefore, there is no need to newly buy another gamma camera 10a. In a low-energy region of a medical X-ray level, further cheap Si elements can be also used as detector elements 71a.

Figure 4:
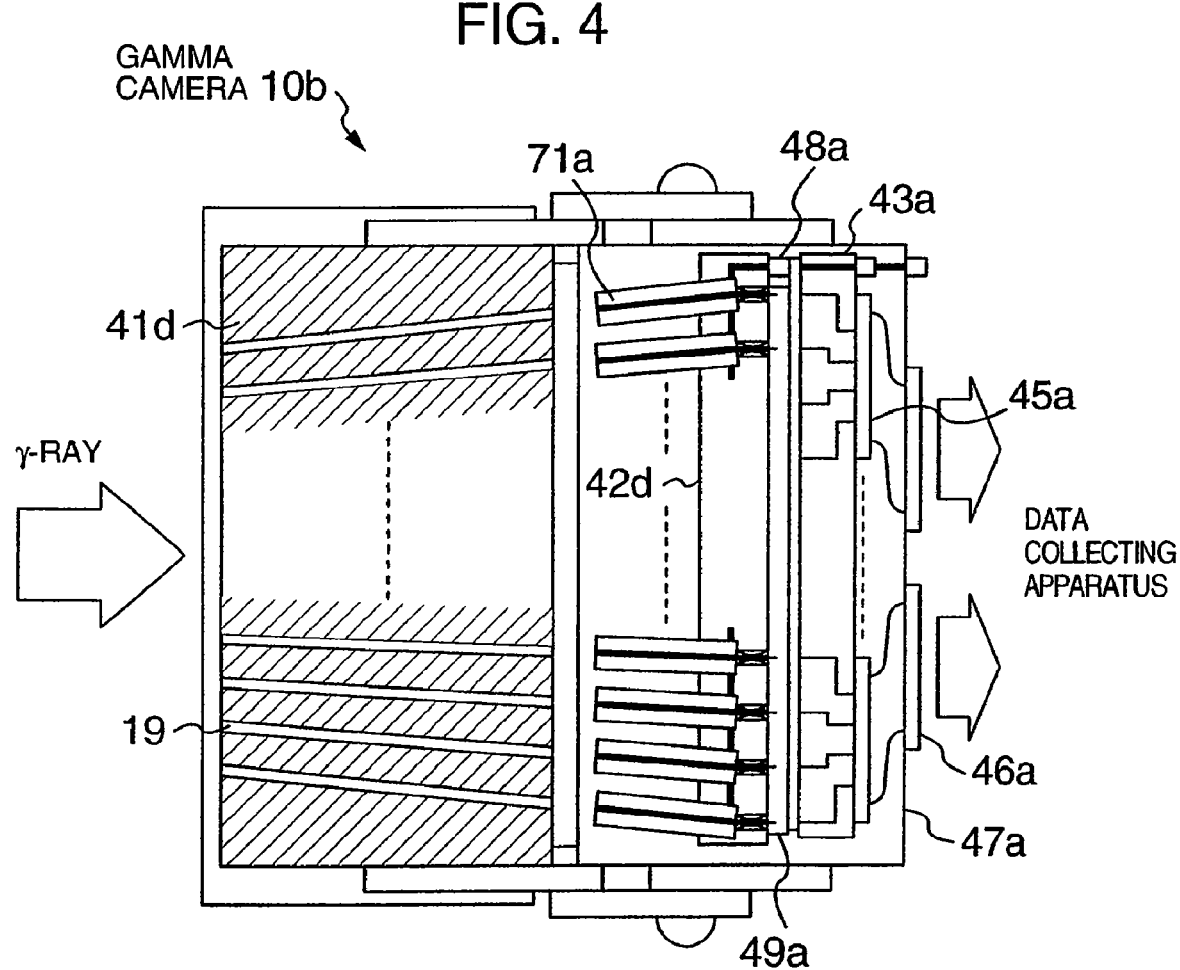
FIG. 4 is a schematic vertical sectional view of a gamma camera of another embodiment to which a converging collimator is applied.

By connecting not only the parallel collimator 41a as shown in FIGS. 2 and 3 but also a converging collimator 41d (refer to a gamma camera 10b shown in FIG. 4) for enlargedly imaging a small portion, the detector module board 42a having an element arrangement corresponding to a diverging collimator for reduction imaging a range larger than an area of a camera, or the like, the detector elements 71a (detector module board 42a) or the collimators 41a and 41d according to the user object can be also selected in one ASIC module board 43a. It is difficult to perform such an imaging by the detector elements on one substrate on which a partition corresponding to each pixel is not provided in the detector element. That is, it is because in the detection of the high-energy γ-ray, the element needs a thickness (depth) and a detection volume has directivity. In the embodiment, since the substrate is partitioned every pixel and axial directions of the detector elements 71a are aligned in the incident direction of the γ-ray of the imaging region, it is also possible to image by the high-energy γ-ray.

Since a variation in imaging form is increased as mentioned above, in addition to a conventional simple equal magnification plane image, an imaging application of the gamma camera 10 can be enlarged.

As mentioned above, according to the first embodiment, advantages such as improvement of the maintenance performance, reduction of the maintenance costs, assurance of the reliability in terms of the manufacturing and maintenance, enlargement of the application range, and the like are obtained.

Figure 5:
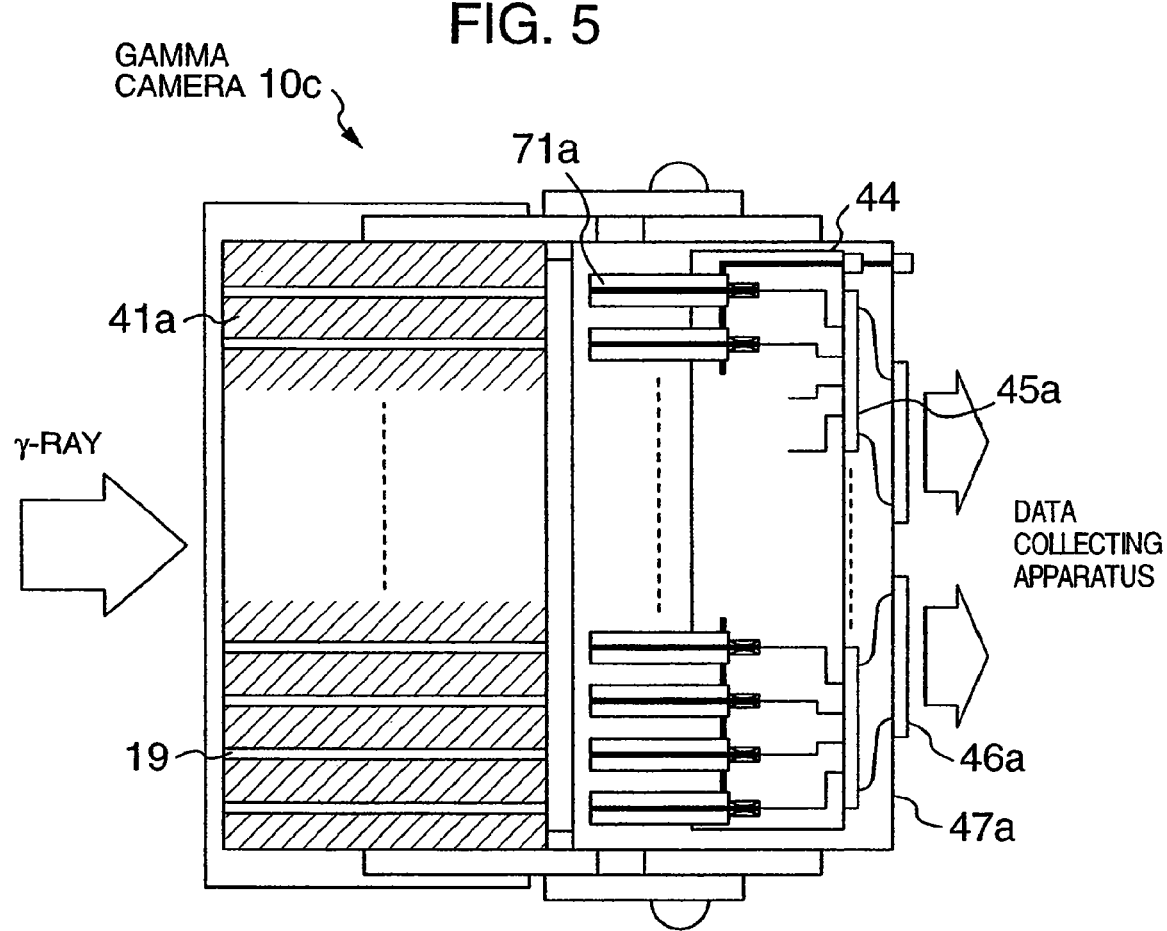
FIG. 5 is a schematic vertical sectional view of another embodiment of a gamma camera.

Although the construction in which the detector module board 42a and the ASIC module board 43a can be separated has been shown in FIG. 2 and the like, both of them can be also integrated so that they cannot be separated as shown at 44 in a schematic vertical sectional view of a gamma camera 10c in FIG. 5. In the construction of FIG. 5, the detector elements 71a can be separated one by one.

An arrangement of the holding portions H to hold the detector elements 71a on the detector module board 42a can be set to, for example, a lattice shape such as checkers. For example, if the detector element 71a has a hexagonal cross section, the arrangement of the holding portions H can be set to a honeycomb-shape.

Second Embodiment

Subsequently, a gamma camera imaging apparatus of the second embodiment to improve the weight saving, downsizing and sensitivity or the like by saving (miniaturization) of collimators will be described with reference to FIG. 6 and the like.

Figure 6:
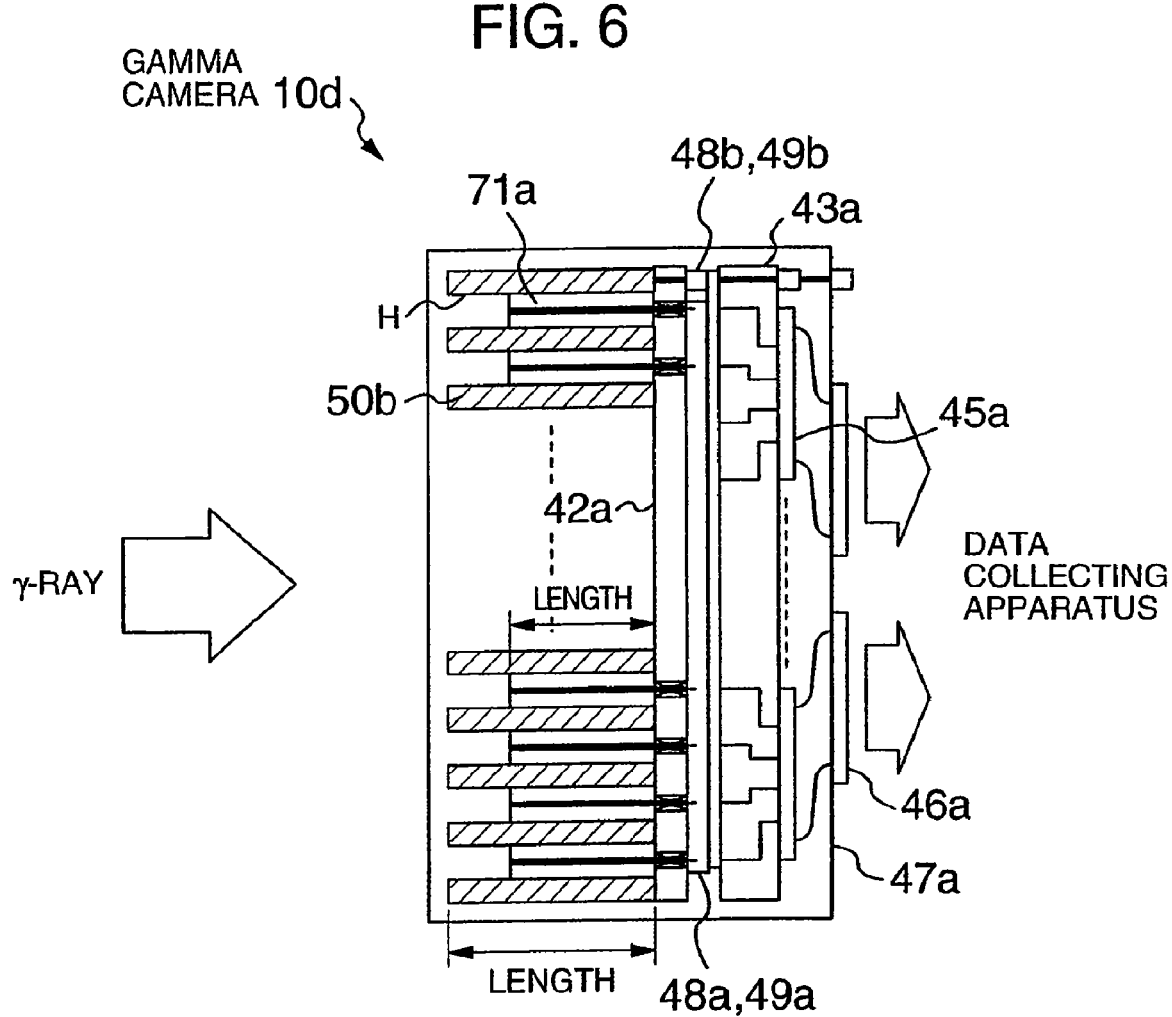
FIG. 6 is a schematic vertical sectional view of a gamma camera of the second embodiment according to the invention.

It is a large feature of a gamma camera 10d of the second embodiment shown in FIG. 6 that the collimator 41a (refer to FIG. 2 and the like) as shown in the first embodiment is omitted (made to be unnecessary). The gamma camera 10d has a lattice-shaped shield 50b constructing a plurality of holding portions H1 as through-holes. Each detector element 71a is fitted and held into each holding portion H1. That is, a whole periphery (excluding a front edge surface and a rear edge surface) of the detector element 71a is surrounded by the shield 50b. The shield 50b is made of a conductive radiation shielding material.

In association with the construction such that the detector element 71a is held by the shield 50b as mentioned above, a cathode potential is supplied to each detector element 71a via the conductive shield 50b. A detector module board 42b has a plurality of holding portions H1 each of which is constructed in a manner such that the cathode spring electrode 55a and the large diameter portion of the holding portions H are removed from the foregoing detector module board 42a and a small diameter portion provided with the anode spring electrode 55b is formed. The number of holding portions H1 is the same as the number of detector elements 71a. The anode 72a comes into contact with the anode spring electrode 55b. The potential supplying pin 48bp is connected to the shield 50b. Since other component elements, that is, the ASIC module board 43a, the connectors 48a, 48b, 49a, and 49b, the ASIC 45a, and the output connector 46a are similar to those in the first embodiment described with reference to FIG. 2 and the like, their explanation is omitted here. That is, the gamma camera 10d of the second embodiment also corresponds to a construction such that the shield 50b to shield the γ-ray is arranged between the detector elements 71a of the radiation detector (gamma camera 10d) having a plurality of detector elements 71a for detecting the radiation, or the like.

Figure 7:
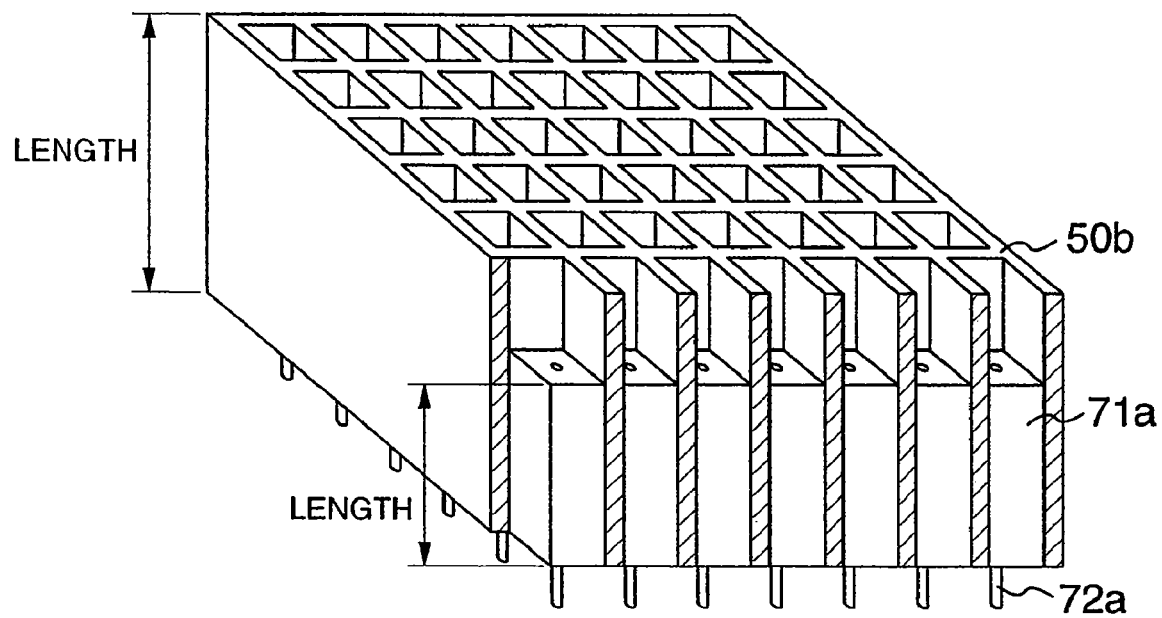
FIG. 7 is a perspective view of a shield in FIG. 6.

The portions of the shield 50b and the detector elements 71a extracted from FIG. 6 are shown in a perspective view of FIG. 7. As shown in FIG. 7, the detector element 71a is arranged in each holding portion H1 of the lattice-shaped shield 50b. Each detector element 71a is either detachable as mentioned in the first embodiment or undetachable (in the following explanation, it is presumed that the detector element 71a is detachable).

Figure 11A:
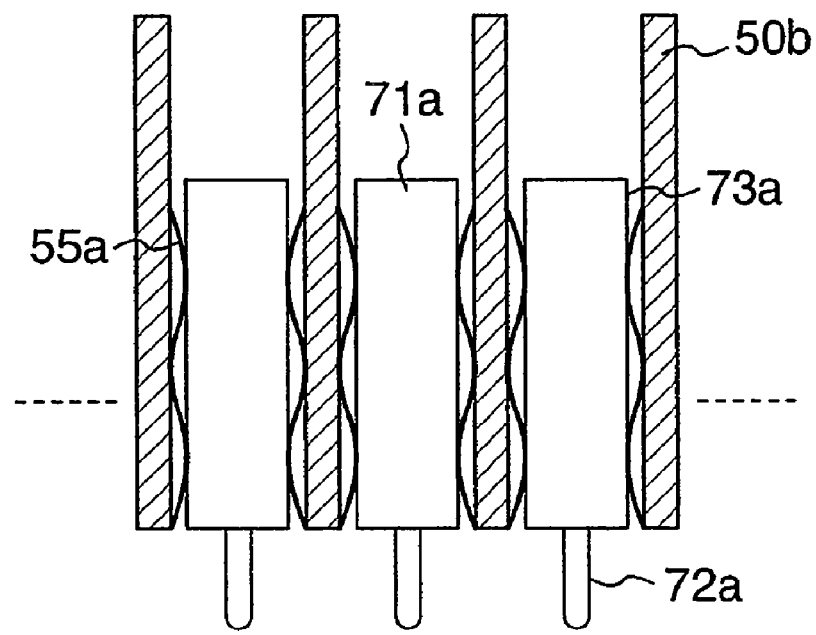
FIG. 11A is an explanatory diagram showing a holding state of a detector element shown in FIG. 6 in the shield.

FIG. 11A shows an example of a holding structure for holding the detector elements 71a. In the shield 50b, the cathode spring electrode 55a which is bent in an arc-shape is arranged on the inside of each holding portion H1. The detector element 71a is detachably fixed by the cathode spring electrode 55a. The detector element 71a is a coaxial electrode element similar to that in the first embodiment and has two electrodes of a center axis and the whole side surface. The outer (the whole side surface) electrode between them is the cathode 73a. By supplying a cathode potential to the shield 50b by the potential supplying pin 48bp, the same electric potential is applied to all of the detector elements 71a which are in contact with each cathode spring electrode 55a. The detector element 71a having the coaxial anode 72a is used and its effects and the like will be described hereinlater.

In the above construction, the shield 50b effectively uses a gap between the detector elements 71a existing in the first embodiment. A front edge portion of the shield 50b plays a role of the collimator 41a in the first embodiment. The shield 50b can be made of the same material as that of the collimator 41a in the first embodiment. The detector element 71a can be detached by inserting a dedicated pair of tweezers into a gap between the detector element 71a and the shield 50b.

The detecting operation and advantages in the second embodiment will be described with reference to FIGS. 12 and 13 in comparison with a prior art of FIGS. 14 and 15.

Figure 14:
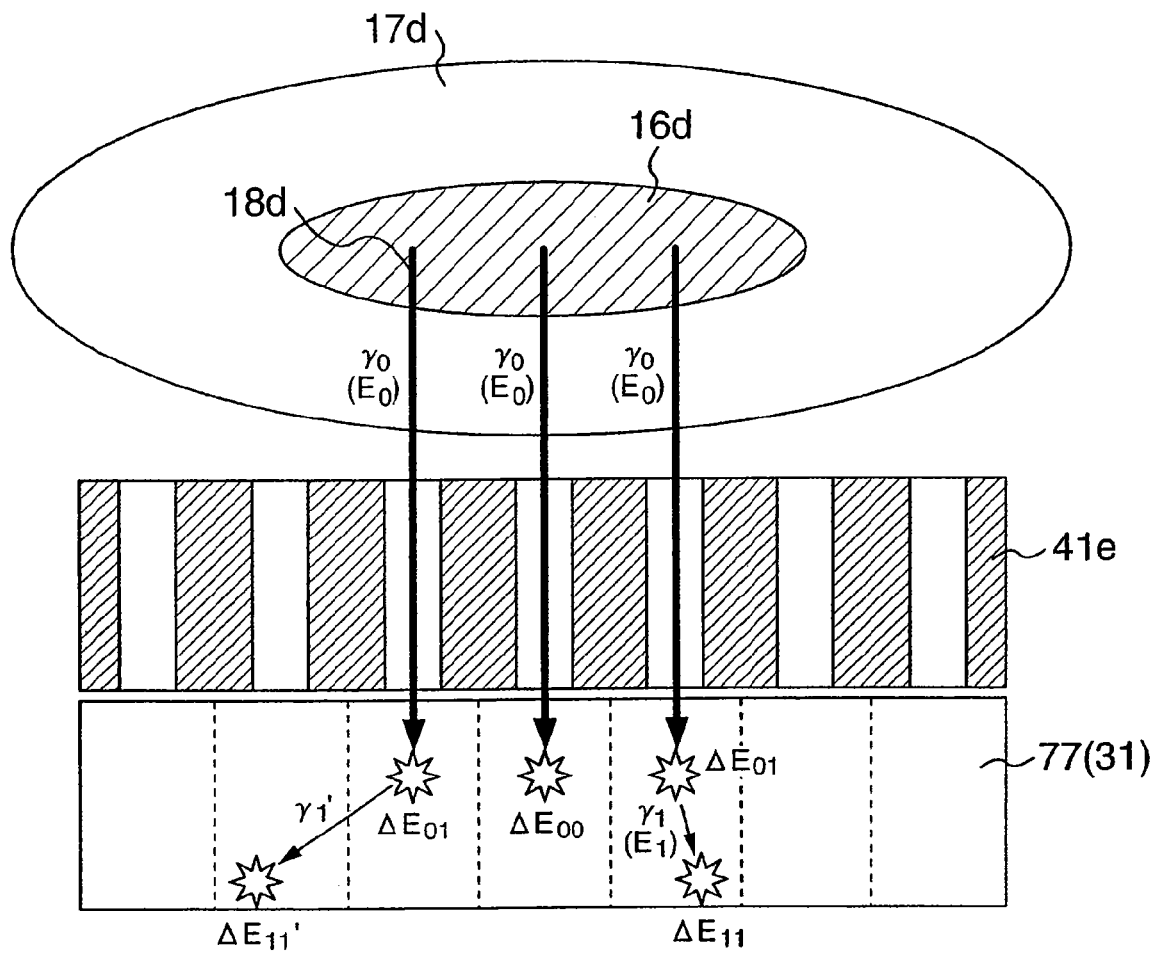
FIG. 14 is an explanatory diagram showing a generation principle of a scattering within detector in a conventional gamma camera shown in FIGS. 26A and 26B.

FIG. 14 shows a main signal component which is detected in the detector element 77 (scintillator 31). FIG. 15 shows an energy spectrum of a detection signal which is obtained in one detector element (pixel). The collimator 41e shown in FIG. 14 is shown as if its length were considerably short for convenience of illustration. Actually, it is very long as shown in FIG. 27. In FIG. 14, reference numeral 16d denotes a γ-ray source (RI nuclear species in the human body of a subject); 17d a subject; 18d a γ-ray emitted from the γ-ray source 16d; and 77 the detector element. FIGS. 12 and 13 show similar information which is obtained in the second embodiment.

First, the detecting operation of the prior art will be described with reference to FIG. 14 and the like.

The γ-ray shown at 18d is emitted from the γ-ray source 16d in the subject 17d. At this time, it is assumed that only the γ-ray of $\gamma_0$ (energy $E_0$) is emitted from the γ-ray source 16d. Although the γ-ray is isotropically emitted from the γ-ray source 16d, only the γ-ray which passes through the collimator 41e is shown in FIG. 14. To the γ-ray $\gamma_0$ (direct γ-ray) which passed through the collimator 41e, total absorption ($\Delta E_{00}$) of the energy due to a photoelectric effect and a decrease in the energy (energy of $\Delta E_{01}$ is emitted) due to scattering occur in the detector element 77 (scintillator 31). Energy $E_1$ of a scattered γ-ray $\gamma_1$ is smaller than the energy $E_0$ of the original γ-ray $\gamma_0$ ($E_1 < E_0$). Assuming that the scattered γ-ray $\gamma_1$ is total-absorbed by the photoelectric effect in the same pixel, energy $\Delta E_{11}$ is emitted. A total value of $\Delta E_{11}$ and $\Delta E_{01}$ is equal to $\Delta E_{00}$. Each of the γ-ray $\gamma_0$ and γ-ray $\gamma_1$ is the γ-ray whose incident direction is specified by the collimator 41e. As mentioned above, by obtaining the signal of the total absorption ($\Delta E_{00}$) of the energy due to the photoelectric effect, the more correct position image information of the γ-ray source 16d can be obtained.

Figure 25:
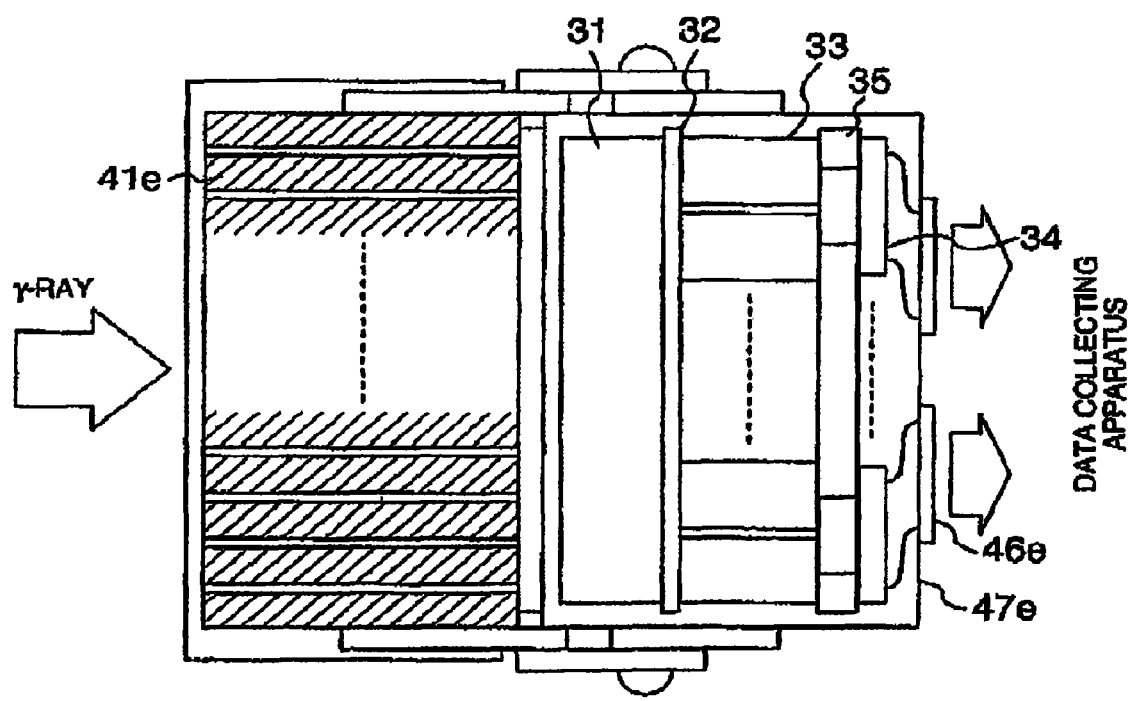
FIG. 25 is a constructional diagram showing a conventional example of a gamma camera.

However, as already described above, the scattered γ-ray $\gamma_1$ in the detector element 77 (scintillator 31) is not always absorbed in the same pixel as that in which the scattering occurred. There is a phenomenon called a scattering radiation detection such that the γ-ray is scattered into the adjacent pixel (portion to detect the γ-ray $\gamma_0$ which inherently enters from a neighboring gap of the collimator 41e) and absorbed there. Energy absorbed due to the scattering radiation detection from adjacent pixels is assumed to be $\Delta E_{11}'$. Besides, the γ-ray scattered in the human body of the subject 17d enters. That is, although the γ-ray $\gamma_0$ of one kind of energy is radiated from the γ-ray source 16d, γ-ray photons which are actually detected by the detector element 77 (or the photomultiplier 33 (refer to FIG. 25) provided on the post stage side of the detector element 77 (scintillator 31) are recognized as γ-rays having different energy as mentioned above.

FIG. 15 shows energy spectra of detected count values of the γ-rays having different energy with respect to a certain pixel.

A scattering radiation in the detector ($\gamma_1'$) is detected irrespective of the position of the γ-ray source 16d, gives false position information, and causes spacial resolution of the image to deteriorate. A signal showing true position information of the γ-ray source 16d is only the total-absorbed signal component of $\Delta E_{00}$, as shown as hatched part in the figure. Therefore, usually, it is necessary to make energy discrimination every detection signal and improve quality of the image by using only the signal of $\Delta E_{00}$ as a signal of a certain energy threshold value Et or more. However, as will be understood from FIG. 15, such a signal is very small as compared with the whole detected count value and includes scattering radiation components. Further, since the incident γ-ray $\gamma_0$ is reduced by the collimator 41e, if the spacial resolution is tried to be raised, the sensitivity fairly deteriorates on the contrary.

Figure 16A:
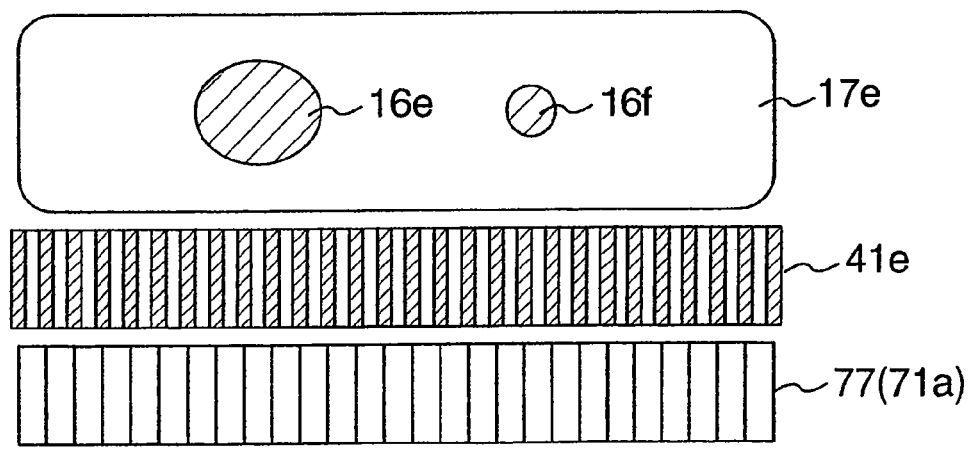
FIGS. 16A to 16C are diagrams showing an example of distribution of measured radiation from γ-ray sources of different energy levels.
Figure 16B:
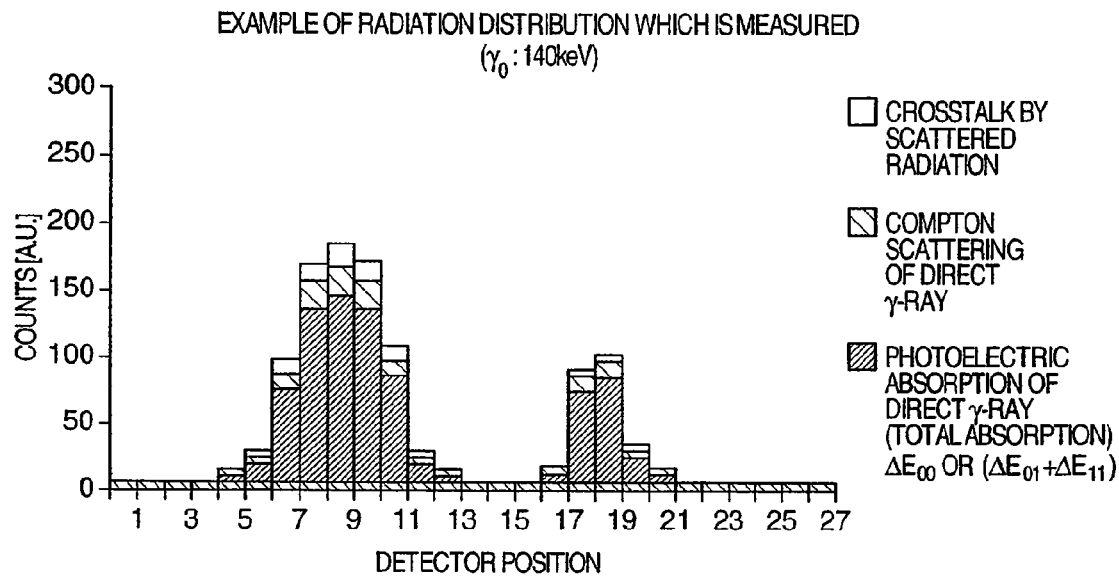
Figure 16C:
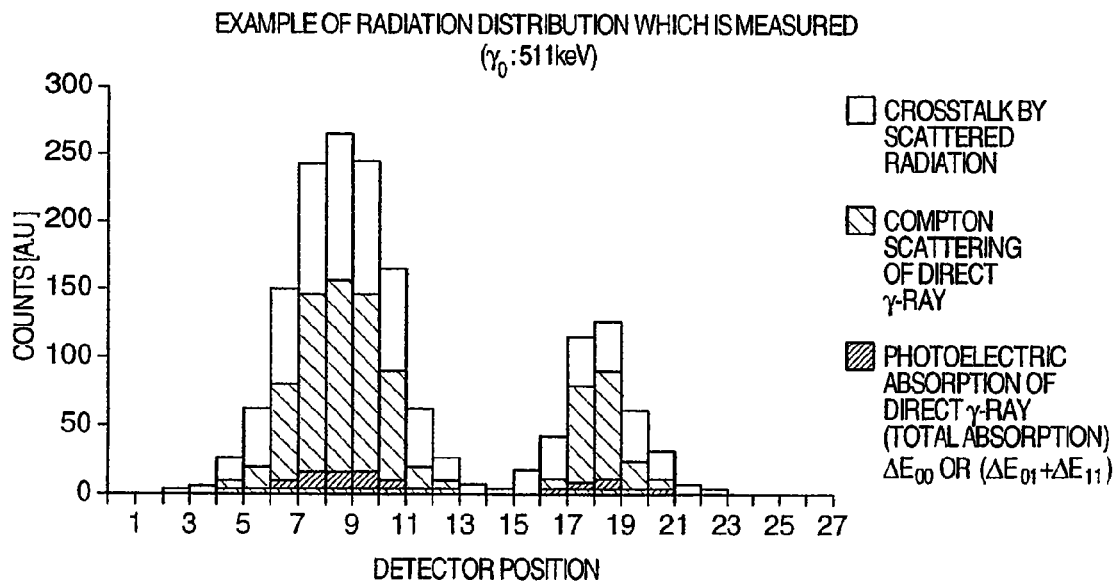

FIGS. 16A, 16B, and 16C show examples of distribution per component of the radiation which is measured.

FIGS. 16B and 16C show the examples of image information (examples of the measured radiation distribution) obtained in the case where two strong and weak γ-ray sources 16e and 16f exist as shown in FIG. 16A and in the case whose energy levels are different two kinds, γ ray energy of γ ray sources 16e, 16f (140 keV, 511 keV) are observed by the detector with the collimator. FIG. 16A shows the positions of the γ-ray sources 16e and 16f and arrangement of the collimator 41e and the detector elements 77. FIG. 16B shows the detection example (example of the measured radiation distribution) of the γ-ray of 140 keV. FIG. 16C shows the detection example (example of the measured radiation distribution) of the γ-ray of 511 keV. CdTe is used as a detector element. In bar graphs of FIGS. 16B and 16C, photoelectric absorption (total absorption) of the direct γ-ray, compton scattering of the direct γ-ray, and the scattering radiation of the compton scattered radiation are shown from the bottom to the top.

As will be obtained from FIG. 16B, in the γ-ray of 140 keV, since a probability of the photoelectric effect is higher than that of the compton scattering, most of the obtained signals are the direct radiation $\gamma_0$ ($\Delta E_{00}$) and even if the energy discrimination is not made, a sufficient clear image can be obtained. However, in the γ-ray of 511 keV of higher energy of FIG. 16C (the γ-ray which is radiated at the time of the PET medical examination), most of the γ-ray which is counted is a scattered event or a scattered radiation [$\gamma_0$ ($\Delta E_{01}$), $\gamma_1'$ ($\Delta E_{11}'$)]. Therefore, if only the $\gamma_0$ ($\Delta E_{00}$) component showing the true information is used, the sensitivity is remarkably lower than that in FIG. 16B, a large S/N ratio cannot be obtained, and it is difficult to obtain good picture quality. To raise the S/N ratio, the detection count number has to be increased by increasing the imaging time. It is unpreferable because a burden on the patient as a subject 17e increases.

Figure 12:
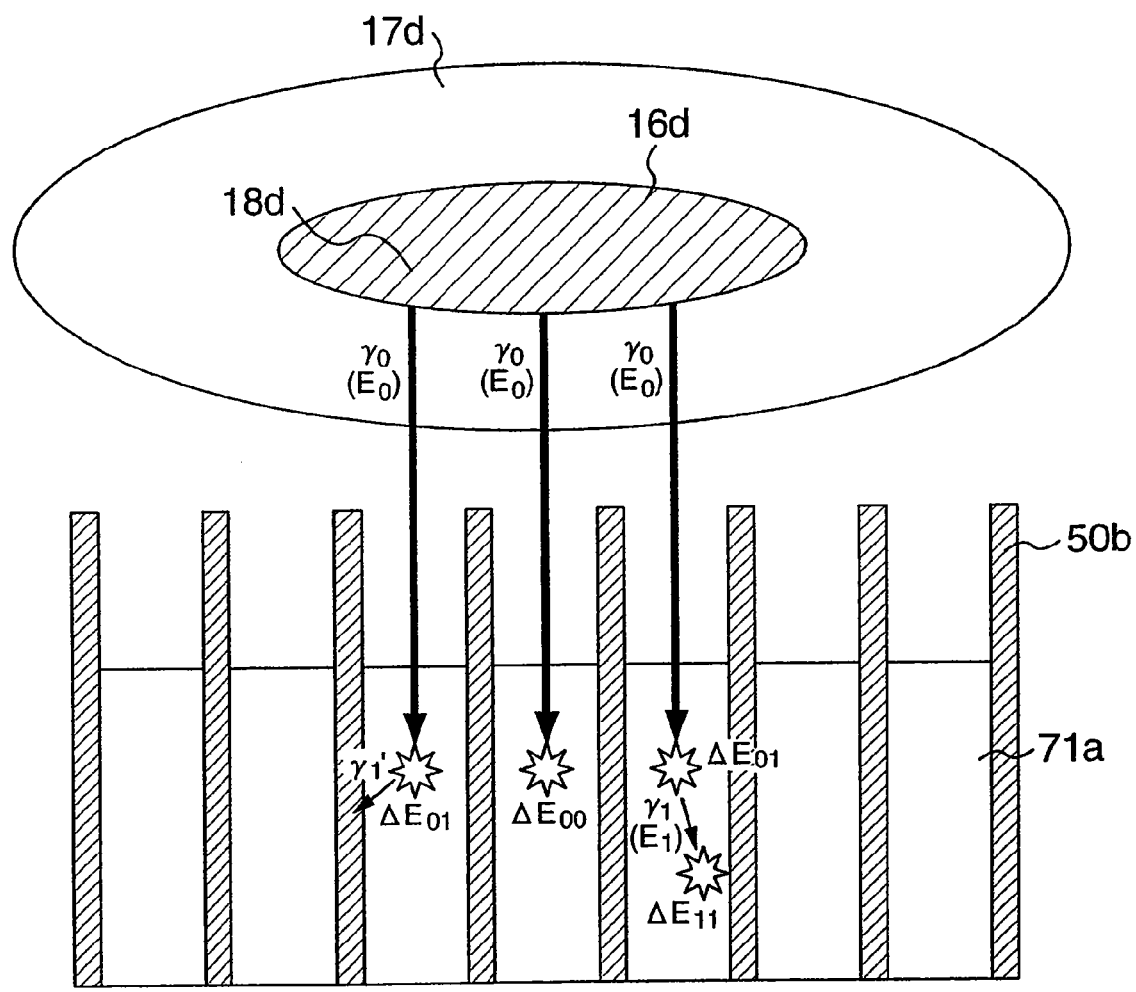
FIG. 12 is an explanatory diagram showing a principle for preventing a scattering radiation from adjacent pixels in the gamma camera shown in FIG. 6 by the shield.

In the second embodiment, the main signal component which is detected in each detector element 71a is as shown in FIG. 12. Unlike FIG. 14, the scattering radiation from adjacent pixels $\gamma_1'$ is eliminated by the shield 50b arranged between the detector elements 71a. Therefore, an energy spectrum is as shown in FIG. 13. An image which is obtained when there is no crosstalk component $\gamma_1'$ will be described with reference to FIG. 16 again.

In FIG. 16C showing the measured radiation distribution example of the γ-ray of 511 keV, naturally, it will be understood that the scattering radiation from adjacent pixels component $\gamma_1'$ ($\Delta E_{11}'$) is widely distributed more than the position of the true γ-ray source and the scattering radiation from adjacent pixels causes the resolution of the image to deteriorate. Now, assuming that the scattering radiation from adjacent pixels can be removed by the construction of the embodiment, it will be understood that the distribution also including the direct γ ray causing compton scattered radiation is not so different from the information of 140 keV shown in FIG. 16B. Therefore, as compared with the prior art in which energy discrimination is carried out to extract $\gamma_0$ ($\Delta E_{00}$), in the embodiment in which the compton scattered component in the detector can be handled as a signal, the fairly high sensitivity (effective count) can be obtained while maintaining the resolution. The positional precision is also improved. Naturally, the maintenance is easy.

As shown in FIG. 6, since the collimator (for example, refer to 41a in FIG. 2 or the like) does not exist in front of the detector elements 71a, it is considered that the γ-ray enters obliquely. However, the portion of the shield 50b projecting forwardly more than the detector elements 71a plays the same role as the collimator. It is necessary to increase the thickness (length) of the detector element 71a for the higher energy γ-ray and a length of shield 50b also increases. However, in the case of considering the elongated detector element 71a as shown in FIG. 6 and the like, since the sensitivity of the detector element 71a itself to the oblique incident component is low, there is particularly no need to arrange the collimator 41a as shown in the first embodiment (it will be obviously understood that the construction in which the long collimator 41a as shown in FIG. 2 is arranged is not excluded).

Figure 8:
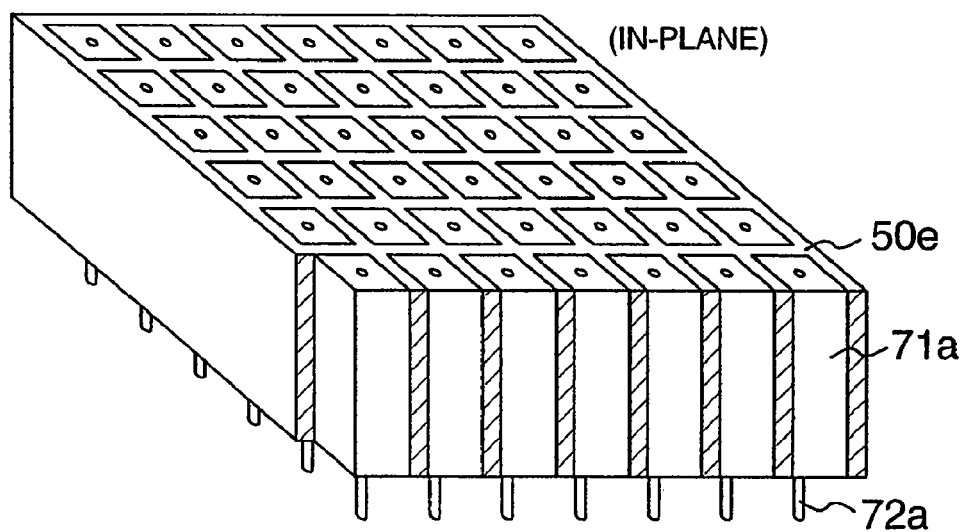
FIG. 8 is a perspective view of another embodiment (a short shield) of the shield.

In the case of imaging the higher energy γ-ray, the larger effect of the invention is obtained. Unless the extremely high image resolution is requested, it is sufficient to set the shield 50b to a length by which the oblique incident component can be suppressed within an allowable range. A sufficient clear image can be obtained even if the length of shield 50b and the length of detector element 71a are set to an equal value so as to obtain an in-plane state as shown in FIG. 8. In FIG. 8, it is also possible to use a construction such that the front edge portion of the detector element 71a is projected from a shield 50e. The improvement of the spacial resolution and the sensitivity by the scattering radiation from adjacent pixels removing effect causes the examining time to be shortened and provides an effect of remarkably decreasing a burden on the patient.

Hitherto, a pulse counting system for obtaining the energy and counting is used and the γ-ray is measured while discriminating the energy of the γ-ray. However, according to the system of the construction of the second embodiment, it is possible to measure it without needing the energy discrimination. Therefore, the invention can be also used in a current mode of product-sum averaging charge currents generated due to the extinction of the γ-ray. In the measurement by the current mode, since the energy of the γ-ray is not measured, a construction of the measuring circuit is simplified. Therefore, also with respect to the ASIC for reading, as compared with the case where the ASIC for counting the pulses can handle only up to tens of channels, the ASIC of one chip can handle a number of channels such as tens of thousands of channels, the apparatus can be easily designed, and the apparatus can be provided with lower costs.

Further, by miniaturizing the collimator and reducing its weight or omitting it, a thin size and a light weight of the gamma camera (radiation detector) itself can be realized. For example, in the prior art (refer to FIGS. 26A and 26B), the collimator has a thickness of 60 mm, the detector element 77 has a thickness of 15 mm, and the ASIC installing board 44' has a thickness of 25 mm, so that a thickness of about 100 mm as a whole length is obtained. According to the construction (refer to FIG. 6) in the second embodiment, however, if the portion of the shield 50b projecting from the detector element 71a is suppressed to 10 mm, it is sufficient to set the total length to about 50 mm. Thus, miniaturization of about ½ can be realized and the maintenance consequently becomes easy.

In the conventional gamma camera for high energy, a weight of sole collimator exceeds 100 kg. An example of an external view of a collimator for middle energy is shown for reference in FIG. 27. For example, according to a New Medical Apparatus Dictionary of the Society of Industrial Examination, in the case of a general collimator for low energy (about 200 keV), a length is equal to 65 mm, a diameter of hole is equal to 3 mm, and a weight is equal to 54 kg. In the case of a general collimator for high energy (>400 keV), a length is equal to 65 mm, a diameter of hole is equal to 4 mm, and a weight is equal to 110 kg. That is, most of the gamma camera is occupied by the weight of collimator. A strength of the apparatus main body (gamma camera casing 11, refer to FIG. 1) for supporting the gamma camera is also very large due to such a weight and an anxiety which is mentally given to the patient due to a coercive feeling or the like is not small. According to the construction of the second embodiment, the shield 50b is equal to about tens of kg and its weight can be reduced into ⅓. The apparatus itself can be miniaturized. Even in the construction of the gamma camera of a flexible arm type, a burden on the arm which supports the gamma camera is small and the camera can be easily handled. Since easiness of handling of the apparatus is improved as mentioned above, a camera setting time of the patient can be shortened and the burden on the patient and the imaging time can be remarkably reduced. The maintenance is also easy.

Figure 9:
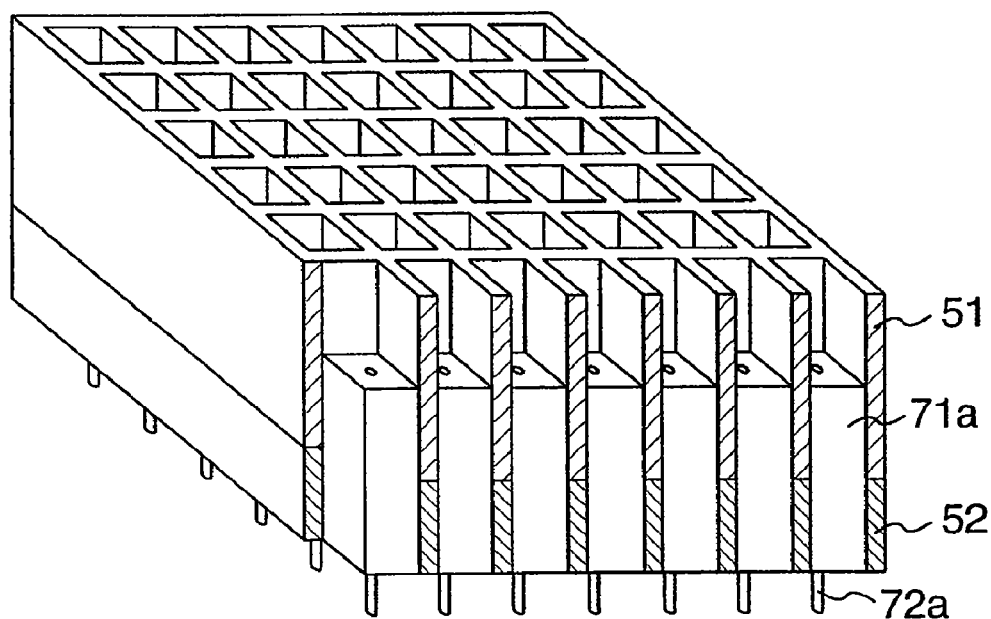
FIG. 9 is a perspective view of another embodiment (a plurality of shields) of the shield.

As further another embodiment of the second embodiment, as shown in FIG. 9, since the number of scattered radiation of low energy compared to $\gamma_0$ increases as the position of the detector element 71a approaches the rear edge, the shield is divided into a front portion and a rear portion, a material of a high shielding effect is used for a front shield 51 and a material of a light weight is used for a rear shield 52, so that a weight of the gamma camera itself can be reduced.

According to those embodiments, as shown in FIG. 17, even a gamma camera obtained by combining a scintillator 31b and a photodiode 36 can have a similar construction and a similar effect can be obtained in principle by the shield 50b. In FIG. 17, reference numeral 42f denotes a detector module board; 43f an ASIC module board; 45f an ASIC; 47f a light shielding casing; and 48f and 49f connectors.

Third Embodiment

Subsequently, an embodiment regarding the structure of the detector elements which can be preferably used to the radiation detectors in the first and second embodiments will be described with reference to the drawings (properly refer to FIG. 18A and the like).

Figure 19A:
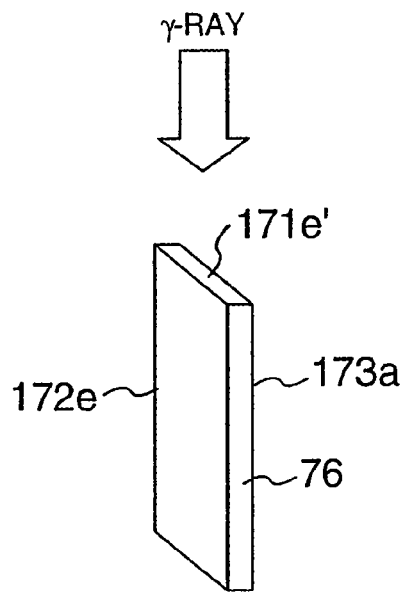
FIG. 19A is a perspective view of a semiconductor device member which is used in another embodiment of a detector element.
Figure 19B:
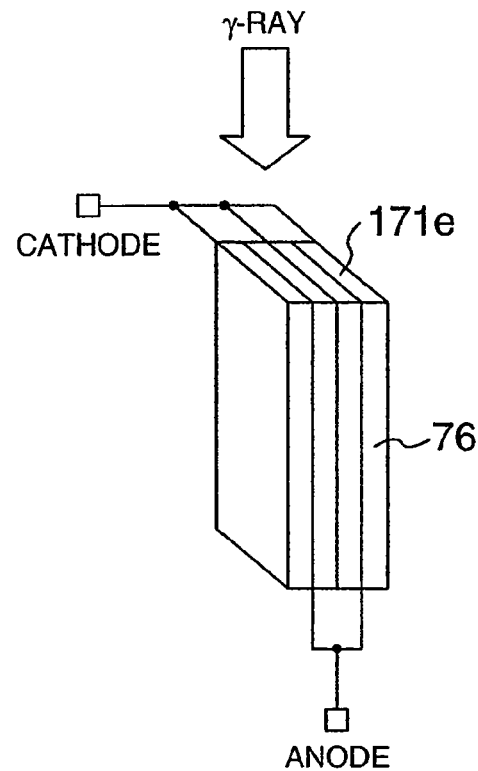
FIG. 19B is a perspective view of another embodiment of a detector element constructed by the semiconductor device members of FIG. 19A.

The detector element 71*a* in FIGS. 18A and 18B, the first embodiment (FIG. 3 and the like), and the second embodiment (FIG. 7 and the like) has a structure such that the pin-shaped anode (anode pin) 72*a* is arranged on a center axis, the semiconductor device 74 surrounds a periphery of the anode 72*a*, and a whole side surface of the semiconductor device 74 is the cathode 73*a*. An ordinary detector element 171*e* as shown in FIGS. 19A and 19B has a structure such that electrodes 172*e* and 173*e* are provided on both surfaces of a plate-shaped semiconductor device 76 called a planer type. To completely collect the charges generated due to the extinction of the γ-ray in the semiconductor device 76 of the detector element 171*e*, an allowable interval between the electrodes (interval between the electrodes 172*e* and 173*e* in FIG. 19A) has an upper limit in dependence on a semiconductor material constructing the semiconductor device. Although such an interval is determined by mobility and a life of charge carrier and an applied electric field, in the case of the high-energy γ-ray, a certain length of device is needed in the incident direction of the γ-ray as mentioned above. Such a length is longer than the allowable electrode interval. Therefore, ordinarily, the detector element 171*e* has a construction such that the electrodes 172*e* and 173*e* are arranged to two side surfaces in the direction which perpendicularly crosses the incident direction of the γ-ray and the γ-ray 1S inputted from a gap between the electrodes which face each other. To raise the detecting sensitivity, as shown in FIG. 19B, there is also a case where the detector elements 171*e* arranged in parallel are adhered so that the same electrodes overlap each other and are used as one unit detector element. The second embodiment in which the shield 50*b* (refer to FIG. 6 and the like) is arranged around the detector element 71*a* has a problem such that if such a unit detector element is applied, since the shield 50*b*has a certain electric potential (cathode potential), the side surface portion without the electrode of the detector element 171*e* is influenced by an electric field due to the electric potential and a strong electric field is locally caused. There is also a problem such that an insulating process has to be executed so that the anode 172*e* exposed to the side does not come into contact with the shield 50*b* to which the cathode potential is supplied.

Figure 11B:
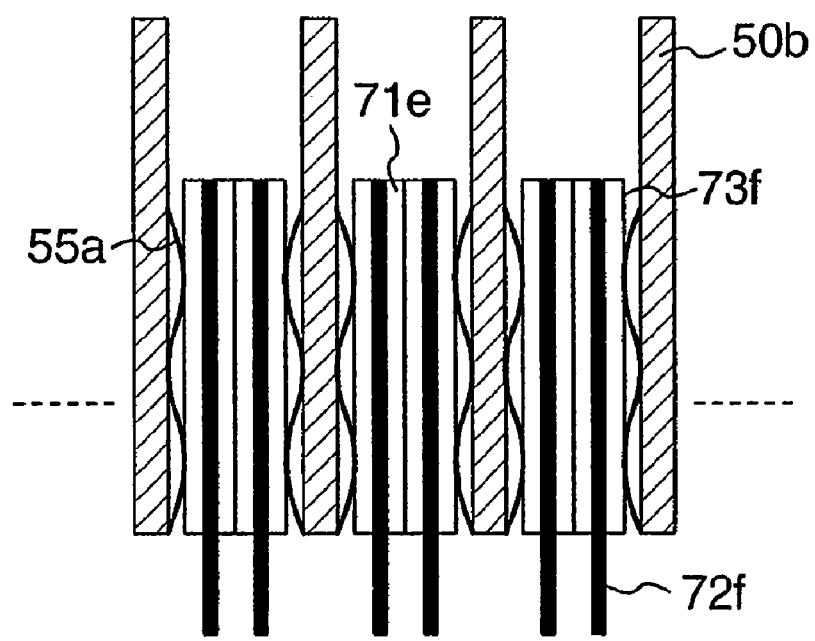
FIG. 11B is an explanatory diagram showing a holding state of the detector element shown in FIG. 22 in the shield.

The detector element 71*a*, which will be explained in the embodiment, is a coaxial element and the whole side surface is the cathode 73*a*. Since the cathode potential is common, no problem occurs even if the detector elements 71*a* are densely arranged and the adjacent detector elements 71*a* come into contact with each other as shown in FIG. 18B. By allowing the detector elements 71*a* to come into contact with each other, the same electric potential can be applied to all of the detector elements 71*a* by supplying the current to one position. According to such a structure, as shown in FIGS. 11A and 11B, both of the holding of the detector elements 71*a*and the current supply to them can be executed by the cathode spring electrodes 55*a* arranged in the lattice-shaped shield 50*b*. That is, by applying the cathode potential to the shield 50*b*, the cathode potential is inevitably supplied to all of the detector elements 71*a* via the cathodes 73*a*. The anodes 72*a* are detection signal terminal and are needed to be independent in each terminal 71*a*. The pin-shaped anode 72*a* arranged on the center axis keeps such independency of each detector element 71*a* and enables the element connection to the detector module board 42*b* (refer to FIG. 2 and the like) to be made by a simple pin connection. Further, the coaxial detector element 71*a* provides an effect of improving the detecting efficiency of the γ-ray, which will be explained hereinlater.

Figure 20A:
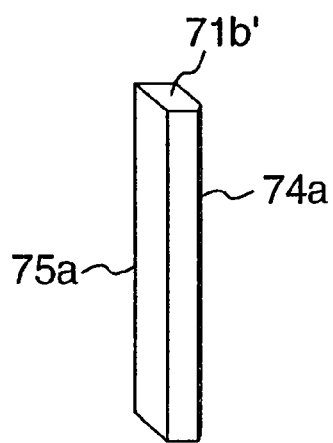
FIG. 20A is a perspective view of a semiconductor device member which is used in a detector element of FIG. 20C.
Figure 20B:
FIG. 20B is a perspective view of an anode which is used in the detector element of FIG. 20C.
Figure 20C:
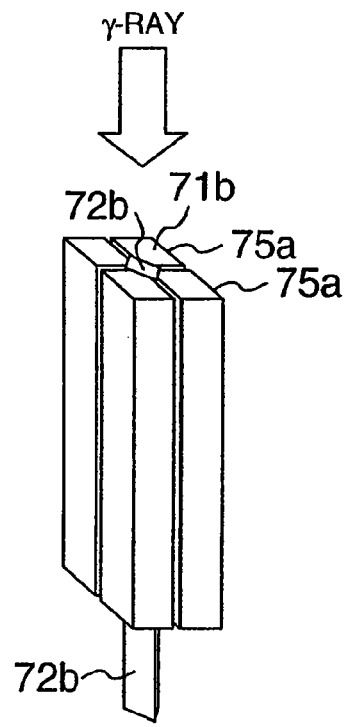
FIG. 20C is a perspective view of another embodiment of the detector element.

As another form of such an element structure, a cathode 75*a* and an anode 74*a* are evaporation deposited onto each of 4-split detector element members 71*b*' as shown in FIG. 20A in consideration of operability of the detector element, respectively. Each anode of the four detector element members 71*b*' is positioned so as to face an anode pin 72*b* having a rectangular cross section as shown in FIG. 20B. One detector element can be also obtained by the four detector element members 71*b*' by adhering those element members and the anodes 74*a* (FIG. 20C).

As shown in FIGS. 21A to 21C, a detector element 71*c* can be also manufactured by using an anode pin 72*c* having a cruciform section. In FIGS. 21A to 21C, reference numeral 71*c*' denotes a detector element member; 74*b* an anode; and 75*b* a cathode.

A phenomenon called a small pixel effect such that by setting an anode area to be smaller than a cathode area, the energy resolution is improved. A planer detector element 71*f* (FIG. 22B) having opposite electrodes called a planer type is constructed in a manner such that an area of an anode 72*f* to collect electrons is set to be smaller than that of a cathode 73*f* and a plurality of semiconductor device members 71*f*' (FIG. 22A) in each of which the anode 72*f* and the cathode 73*f* are provided on different surfaces are arranged in parallel. According to the detector element 71*f*, energy resolution can be further increased by the small pixel effect. Consequently, the detecting efficiency of the γ-ray is improved.

The increased energy resolution means that the region $\Delta E_{00}$ or $\Delta E_{01}+\Delta E_{11}$ becomes sharp in FIG. 15. That is, while carrying out energy discrimination, energy threshold can be increased in FIG. 10, mixing ratio of the scattering radiation is decreased, and S/N ratio is improved. As the result, a more brilliant image can be obtained as same as the increased sensitivity.

Figure 10:
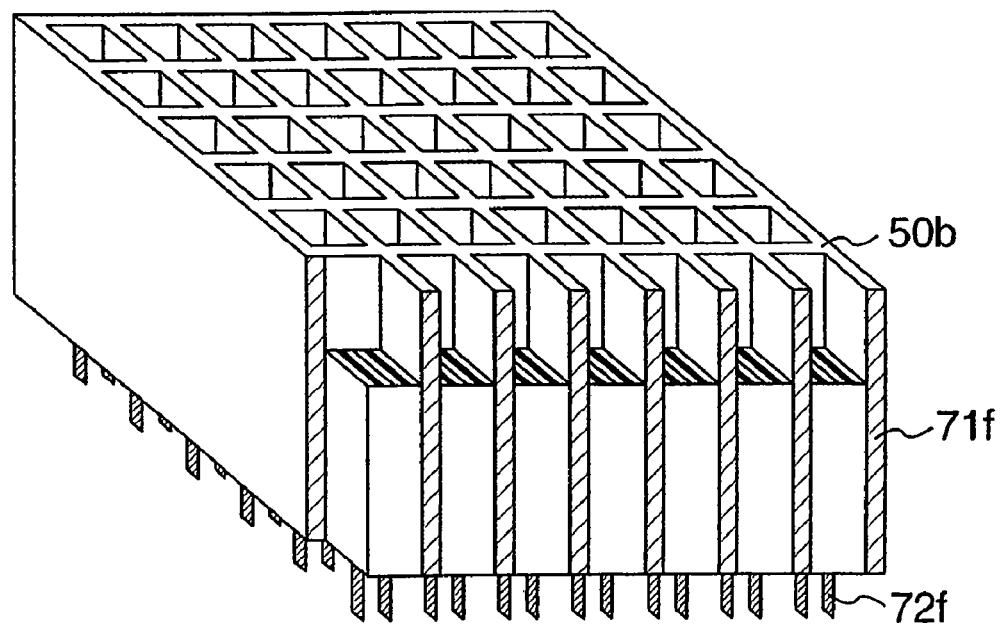
FIG. 10 is a perspective view of a shield to which a detector element shown in FIG. 22B is applied.

An example of a construction obtained by combining the detector elements 71*f* and the lattice-shaped shield 50*b* is shown in FIG. 10. An example of a construction in which the detector elements 71*f* are held in the shield 50*b* is shown in FIG. 11B. In this case, the detector elements 71*f*are held in a manner such that the cathode 73*f* of the detector element 71*f* comes into contact with the cathode spring electrodes 55*a* provided in the shield 50*b*. Since the anodes 72*f*are not protruded over the side surface of the detector element, it does not come into contact with the shield 50*b*. Therefore, there is no need to insulate the shield 50*b* and the detector elements 71*f*. The contact by the cathode spring electrodes 55*a* can be received by the cathodes 73*f* on both sides. Since the anodes 72*f* are concentrated on the center portion of the detector element 71*f*, an influence of the electric field by the lattice-shaped shield 50*b* is small. The above construction can be regarded as a very practical construction from a viewpoint of manufacturing of the detector elements 71*f*. Owing to such an element structure, it is possible to realize a practical gamma camera of the element separating type using the detector elements in which a plurality of semiconductor device members are arranged in parallel.

Figure 23:
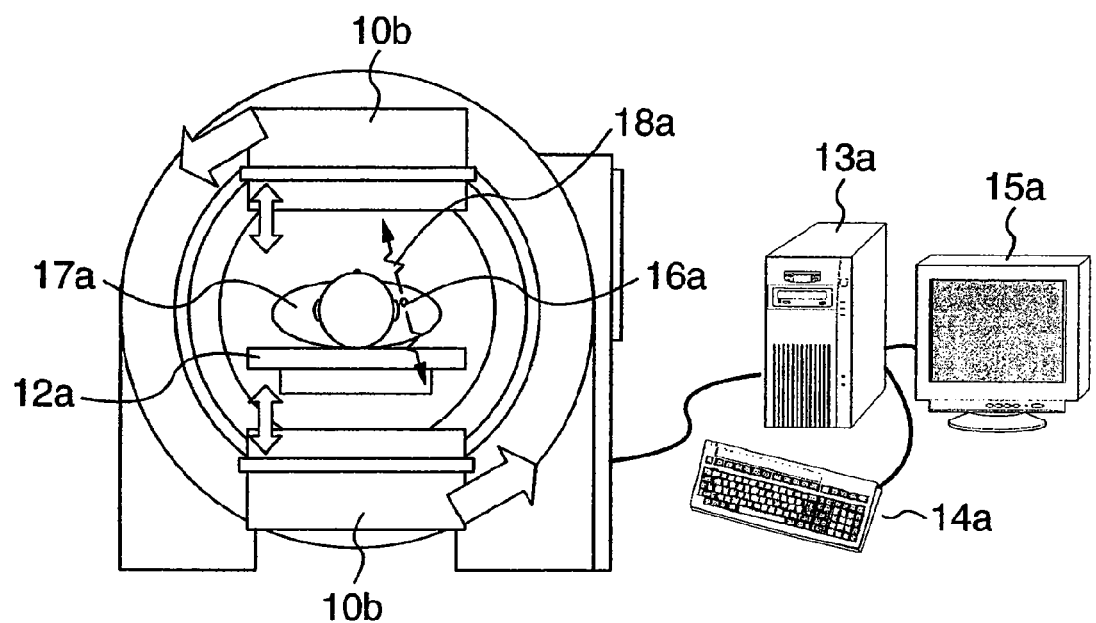
FIG. 23 is a constructional diagram of a radiation imaging apparatus (SPECT apparatus)

The radiation detector and the detector elements as mentioned above are very effective in the gamma camera imaging apparatus described with reference to FIG. 1. Besides, it will be naturally understood that similar effects are also obtained by an SPECT (Single Photon Emission Computed Tomography) apparatus for obtaining a stereoscopic image by rotating two gamma cameras 10b arranged so as to face each other as shown in FIG. 23. Not only the effect of improvement of the sensitivity (efficient count, increase of S/N ratio) but also advantages common to those of the gamma camera such as improvement of the maintenance performance, reduction of the maintenance costs, realization of the thin shape and light weight of the apparatus, decrease in burden on the patient owing to the reduction of the examining time, and the like are obtained. Particularly, in the SPECT apparatus using a plurality of gamma cameras, the improvement of the maintenance performance, the reduction of the maintenance costs, and the realization of the light weight become large advantages. In the SPECT apparatus, the two gamma cameras 10d (FIG. 6) can be also provided in place of the gamma camera 10b.

Figure 24:
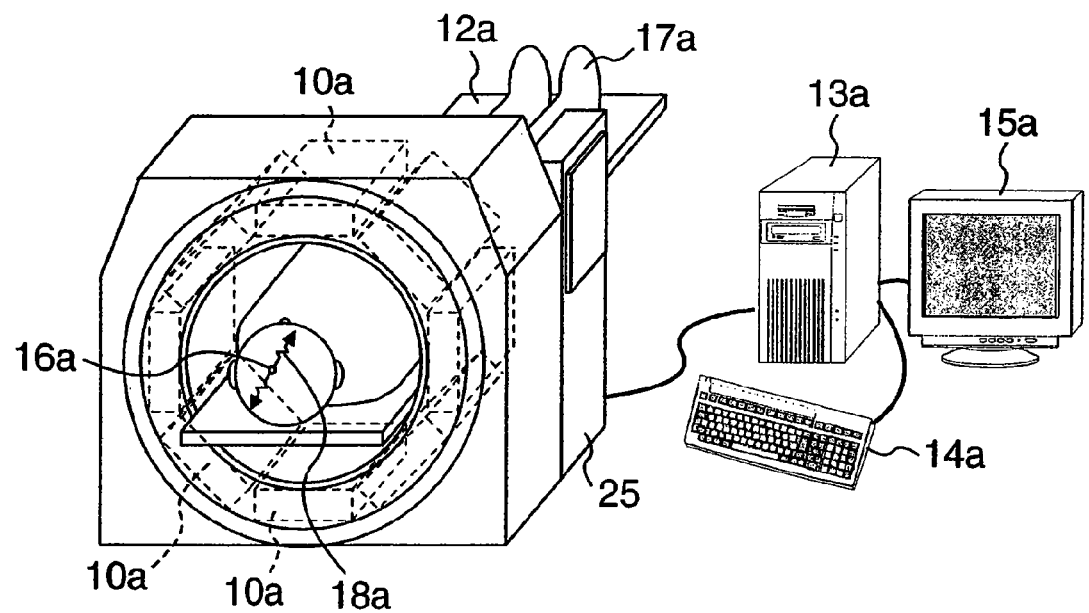
FIG. 24 is a constructional diagram of a radiation imaging apparatus (PET apparatus)

In the PET apparatus, there is also a case where the number of imaging pixels is equal to hundreds of thousands of pixels or more. If a large camera unit is exchanged because there are tens of defective elements, running cost performance fairly increased. Therefore, according to a PET apparatus 25 shown in FIG. 24, a plurality of gamma cameras 10a each having the detachable detector elements 71a and the like and the connector boards (the detector module board 42a and the ASIC module board 43a) which can be separated from the ASIC are arranged like a ring around the bed 12a. Thus, the maintenance performance and the running cost performance of the PET apparatus can be remarkably improved. Since the PET apparatus uses the high-energy γ-ray of 511 keV as a target, the detecting efficiency is very low in the prior art as mentioned above. Therefore, the application of the gamma camera 10a or the like to the PET apparatus improves the detecting efficiency of the γ-ray and increases the position specifying precision of the detector elements in which the γ-ray entered. Another gamma camera mentioned above such as a gamma camera 10d or the like can be also used in place of the gamma camera 10a.

The invention described above are not limited to the foregoing embodiments but many modifications and variations are possible. For example, the invention can be embodied by properly combining the first to third embodiments. Although the embodiments have been described mainly with respect to the medical application as an example, the application is not limited to it but the invention can be widely applied to general industries, studying application, and the like. The semiconductor material of the semiconductor detector elements is not limited to a specific material either. Although the detector element 71a are detachably held via the spring electrodes 55a or 55b, such a holding structure is shown as an example and another holding mechanism can be also used.

As described above, according to the invention, it is possible to contribute to the improvement of the detecting efficiency of the radiation in the radiation detector.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A radiation detector comprising:
an element holding member including a plurality of radiation detector elements, and wherein each radiation detector element has a first electrode and a second electrode, and wherein electric potentials of the first electrodes are different than respective electric potentials of the second electrodes, and wherein said element holding member has a plurality of first signal line connectors outputting signals from the first electrodes, and at least one second signal line connector outputting a signal from the second electrodes; and
an integrated circuit holding member to which an integrated circuit for processing radiation detection signals outputted from the radiation detector elements is provided, and including a plurality of third signal line connectors connected to the first signal line connectors, and at least a fourth signal line connector connected to the second signal line connector; and
wherein the first signal line connectors, the second signal line connector, the third signal line connectors, and the fourth signal line connector are detachably connected on a same surface, and the element holding member and the integrated circuit holding member are connected to each other.

2. A radiation detector according to claim 1, wherein the first electrodes are signal electrodes for outputting signals representing detection of radiation, and the second electrodes include an electrical potential supplying electrode for supplying electrical potential to at least one of the radiation detector elements.

3. A radiation detector according to claim 2, wherein the electrical potential supplying electrode is a common electrode for supplying electrical potential commonly to the plurality of radiation detector elements.

4. A radiation detector according to claim 1, wherein at least one of the first electrodes is disposed inside a respective one of the radiation detector elements, and wherein at least one of the second electrodes is disposed outside the respective one of the detector elements.

5. A radiation detector according to claim 1, wherein the second signal line connector is disposed at an end of the element holding member, and the fourth signal line connector is disposed at an end of the integrated circuit holding member.

6. A radiation detector according to claim 1, wherein at least one radiation detector element is a semiconductor element.

* * * * *